United States Patent
Horikoshi et al.

(10) Patent No.: US 11,754,882 B2
(45) Date of Patent: Sep. 12, 2023

(54) OPTICAL COMPENSATION DEVICE AND LIQUID CRYSTAL DISPLAY DEVICE

(71) Applicant: Sony Group Corporation, Tokyo (JP)

(72) Inventors: Ryoko Horikoshi, Kanagawa (JP); Keigo Inoue, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 97 days.

(21) Appl. No.: 17/424,310

(22) PCT Filed: Nov. 13, 2019

(86) PCT No.: PCT/JP2019/044555
§ 371 (c)(1),
(2) Date: Jul. 20, 2021

(87) PCT Pub. No.: WO2020/158109
PCT Pub. Date: Aug. 6, 2020

(65) Prior Publication Data
US 2022/0137464 A1    May 5, 2022

(30) Foreign Application Priority Data

Jan. 28, 2019 (JP) ................................. 2019-012530

(51) Int. Cl.
*G02F 1/13363*   (2006.01)
*G02F 1/1337*    (2006.01)
*G03B 21/00*     (2006.01)

(52) U.S. Cl.
CPC .. *G02F 1/133634* (2013.01); *G02F 1/133632* (2013.01); *G02F 1/133742* (2021.01);
(Continued)

(58) Field of Classification Search
CPC ................. G02F 1/1335; G02F 1/1336; G02F 1/133634; G02F 1/13363; G02F 1/133632;
(Continued)

(56) References Cited

U.S. PATENT DOCUMENTS

2007/0076150 A1  4/2007  Hale et al.
2007/0077372 A1  4/2007  Chung
(Continued)

FOREIGN PATENT DOCUMENTS

JP      2013-97025 A1      5/2013
WO   WO 2008/078764 A1    7/2008

OTHER PUBLICATIONS

International Search Report dated Feb. 10, 2020 in PCT/JP2019/044555 filed Nov. 13, 2019, 2 pages.

*Primary Examiner* — Thoi V Duong
(74) *Attorney, Agent, or Firm* — Oblon, McClelland, Maier & Neustadt, L.L.P.

(57) ABSTRACT

An improvement in image quality is achieved by compensating for a phase difference occurring in tilted light to achieve an improvement in contrast while suppressing luminance irregularity when in black display.
An optical compensation device includes: a first optical compensation unit configured to generate a phase difference that has a substantially equal amount and a reverse sign in light with each incidence angle within a predetermined incidence angle range on a vertical alignment type liquid crystal panel with respect to a phase difference occurring from the liquid crystal panel; and a second optical compensation unit configured to generate a phase difference in an in-plane direction. The first optical compensation unit can appropriately compensate for a phase difference occurring in tilted light passing through a liquid crystal panel and the
(Continued)

second optical compensation unit can suppress luminance irregularity when in black display.

15 Claims, 33 Drawing Sheets

(52) U.S. Cl.
CPC ...... *G02F 2203/01* (2013.01); *G02F 2203/02* (2013.01); *G02F 2413/02* (2013.01); *G02F 2413/10* (2013.01); *G02F 2413/14* (2013.01); *G03B 21/006* (2013.01)

(58) Field of Classification Search
CPC ............. G02F 1/133635; G02F 1/1337; G02F 1/133742; G02F 1/133746; G02F 1/133749; G02F 2203/01; G02F 2203/02; G02F 2203/62; G02F 2413/02; G02F 2413/10; G02F 2413/14; G02F 2413/03; G02F 2413/07; G03B 21/006; G03B 21/206; G03B 21/208; G02B 5/30
See application file for complete search history.

(56) References Cited

U.S. PATENT DOCUMENTS

| | | |
|---|---|---|
| 2007/0085951 A1 | 4/2007 | Hale et al. |
| 2009/0244455 A1* | 10/2009 | Horikoshi ......... G02F 1/133634 349/120 |
| 2010/0026918 A1 | 2/2010 | Nakagawa et al. |
| 2010/0221459 A1 | 9/2010 | Chung |

* cited by examiner

OPTICAL COMPENSATION DEVICE AND LIQUID CRYSTAL DISPLAY DEVICE

TECHNICAL FIELD

The present technology relates to an optical compensation device and a liquid crystal display device and, in particular, to the technical field of compensation for a phase shift occurring in light passing through a vertical alignment type liquid crystal panel.

BACKGROUND ART

As liquid crystal projector devices displaying image information using liquid crystal panels, for example, liquid crystal projector devices are known. Liquid crystal display devices generate image light in which image information is reflected by causing light coming from light sources to be incident on liquid crystal panels and performing spatial light modulation, and display the image information by projecting the generated image light to target media such as screens, for example.

One important element for determining quality of images to be projected is contrast, which is a ratio of brightness in black display and white display. To improve contrast in a liquid crystal projector device, it is effective to set brightness in black display to a required minimum.

On the other hand, in some liquid crystal projector devices, vertical alignment (VA) type panels are used as liquid crystal panels. In VA type liquid crystal panels, liquid crystal alignment is disposed to be vertical to a substrate of a panel when a voltage is not applied, and liquid crystal is tilted in the vertical direction of the substrate when a voltage is applied. Thus, high contrast can be realized at a high speed. In VA type liquid crystal panels, it is ideal for black to be displayed in a normally black state, that is, a state in which no voltage is applied. However, actually, when a voltage is not applied, light leakage occurs and thus reproducibility of black deteriorates, which results in deterioration in contrast. In particular, in VA type liquid crystal panels, liquid crystal is pre-tilted in a voltage-unapplied state, that is, liquid crystal is tilted in advance in the vertical direction of a substrate. Thus, a phase shift is caused in light passing through a liquid crystal panel due to pre-tilting, and thus light leakage may be promoted due to the phase shift.

Here, VA type liquid crystal panels in which thicknesses are constant and liquid crystal is pre-tilted can be modeled as a tilted positive C plate (a medium in which a refractive index is large in a thickness direction) in simulation. Therefore, to compensate for a phase shift occurring in VA type liquid crystal panels, an optical compensation plate formed as a negative C plate (a medium in which a refractive index is small in a thickness direction) is disposed to be tilted in the same direction as pre-tilting of liquid crystal. Thus, it is effective to offset a phase shift occurring in the liquid crystal panel by a phase shift occurring using the optical compensation plate.

As a scheme of compensating for a phase shift occurring in VA type liquid crystal panels, there is a scheme of using an O plate along with a negative C plate, for example, as disclosed in PTL 1. Here, the O plate is an optical medium in which an N1 axis with a largest refractive index is tilted with respect to the thickness direction when represented as a refractive index ellipsoid. The O plate is formed by forming an inorganic film by oblique vapor deposition.

CITATION LIST

Patent Literature

[PTL 1]
WO 2008/078764

SUMMARY

Technical Problem

Here, for a slope of the N1 axis of the O plate, there is a limitation of, for example, a deposition device or a jig, and thus it is difficult to set the slope freely. The slope of the N1 axis is in the range of about 45 degrees to 60 degrees. On the other hand, an angle of pre-tilting in a liquid crystal panel (hereinafter referred to as a "pre-tilting angle") is about several degrees.

From the viewpoint of the shape of the refractive index ellipsoid, the O plate is biaxial because of oblique vapor deposition, but liquid crystal is uniaxial. PTL 1 describes that a phase shift occurring in a liquid crystal panel due to pre-tilting is compensated for directly in one O plate (3-dimensionally through a scheme of disposing a negative C plate obliquely), but this is very difficult for the above reason. That is, a slope angle of the N1 axis is very large, and thus it is difficult to match the slope angle with the pre-tilting angle of liquid crystal, the shape of the refractive index ellipsoid is not matched with the liquid crystal side, and it is very difficult to appropriately compensate for the phase shift.

PTL 1 discloses a compensation plate in which two O plates and a negative C plate are combined. However, an in-plane phase difference (=front phase difference) occurring from only a refractive index ellipsoid projected to the O plate surface and a phase difference Rth in a thickness direction (in PTL 1, the both are defined as retardations) is disclosed. Appropriate compensation of a tilted light component, that is, a component of light incident at an angle tilted with respect to the thickness direction, is not described. Although the foregoing front phase difference and phase difference Rth in the thickness direction are designed to match a phase difference occurring in liquid crystal, it is difficult to appropriately offset the phase difference occurring from tilted light at each incident angle with that design.

Although an optical compensation plate is used to compensate for the foregoing tilted light and an improvement of contrast is achieved, luminance irregularity becomes a problem in black display. The luminance irregularity in the black display can occur due to various events such as an influence of birefringence arising as an optical element expands at a high temperature or mechanical stress arising from a holding mechanism that holds an optical element. The degree of luminance irregularity increases or decreases depending on, for example, a combination of a liquid crystal panel or an optical compensation plate. In liquid crystal panels, there is a tilting variation, a thickness variation, or the like of liquid crystal. In an optical compensation plate, there is irregularity in a phase difference. Thus, an occurrence aspect of the irregularity differs depending on irregularity states.

Causes of the luminance variation include not only causes of variations in the liquid crystal panel and the optical compensation plate but also causes of a luminance variation in a plane by nature, such as viewing angle characteristics of a polarization plate or an intensity distribution of light from a lighting system.

The present technology is devised in view of the foregoing circumstances and an objective of the present technology is to achieve an improvement in image quality by compensating for a phase difference occurring in tilted light to achieve an improvement in contrast and thus suppressing luminance irregularity in black display.

Solution to Problem

An optical compensation device according to the present technology includes a first optical compensation unit configured to generate a phase difference that has a substantially equal amount and a reverse sign in light with each incidence angle within a predetermined incidence angle range on a vertical alignment type liquid crystal panel with respect to a phase difference occurring from the liquid crystal panel; and a second optical compensation unit configured to generate a phase difference in an in-plane direction.

The first optical compensation unit can appropriately compensate for a phase difference occurring in tilted light passing through a liquid crystal panel. Further, the second optical compensation unit can suppress luminance irregularity in black display.

In the optical compensation device according to the present technology, an optical compensation plate included in the first optical compensation unit may be disposed parallel to the liquid crystal panel.

Thus, the phase of the tilted light is compensated by the optical compensation plate disposed parallel to the liquid crystal panel.

The optical compensation device according to the present technology may further include a rotation adjustment mechanism configured to adjust a rotational angle in an in-plane direction of the optical compensation plate included in the second optical compensation unit.

Thus, it is easy to optimize the compensation effect of luminance irregularity.

In the optical compensation device according to the present technology, an optical compensation plate included in the first optical compensation unit may preferably be formed so as to be integrated with an optical compensation plate included in the second optical compensation unit.

Thus, it is possible to achieve a reduction in the number of components by integral molding and miniaturization of the optical system.

In the optical compensation device according to the present technology, an optical compensation plate included in the first optical compensation unit and an optical compensation plate included in the second optical compensation unit may preferably be formed so as to be separated as separate optical compensation plates.

Thus, for example, the degree of disposition of the compensation plates can be improved, for example, by separately disposing the optical compensation plate included in the first optical compensation unit and the optical compensation plate included in the second optical compensation unit before and after the liquid crystal panel along an optical path from the light source, and by separately disposing some of the optical compensation plates among the optical compensation plates and the other optical compensation units before and after the liquid crystal panel along the optical path and separately disposing the optical compensation plates included in the second optical compensation unit before and after the liquid crystal panel when the number of optical compensation plates included in the first optical compensation unit is plural.

In the optical compensation device according to the present technology, one or all of an optical compensation plate included in the first optical compensation unit and an optical compensation plate included in the second optical compensation unit may preferably be formed so as to be integrated with the liquid crystal panel or a polarization plate.

Thus, it is possible to achieve a reduction in the number of components by integral molding and miniaturization of the optical system.

A liquid crystal display device according to the present technology includes: a vertical alignment type liquid crystal panel; a first optical compensation unit configured to generate a phase difference that has a substantially equal amount and a reverse sign in light with each incidence angle within a predetermined incidence angle range on the liquid crystal panel with respect to a phase difference occurring from the liquid crystal panel; and a second optical compensation unit configured to generate a phase difference in an in-plane direction.

In the liquid crystal display device according to the embodiment, it is possible to obtain similar operational effects as those of the optical compensation device according to the present technology.

In the liquid crystal display device according to the present technology, the liquid crystal panel may preferably be a transmissive liquid crystal panel.

Thus, it is possible to achieve suppression in luminance irregularity in black display while appropriately offsetting a phase difference occurring in tilted light in correspondence with a case in which the transmissive liquid crystal panel is adopted can be handled.

In the liquid crystal display device according to the present technology, the liquid crystal panel may preferably be a reflective liquid crystal panel.

Thus, it is possible to achieve suppression in luminance irregularity in black display while appropriately offsetting a phase difference occurring in tilted light in correspondence with a case in which the reflective liquid crystal panel is adopted.

In the liquid crystal display device according to the present technology, an optical compensation plate included in the first optical compensation unit may preferably be disposed parallel to the liquid crystal panel.

Thus, the phase of the tilted light is compensated by the optical compensation plate disposed parallel to the liquid crystal panel.

The liquid crystal display device according to the present technology may preferably further include a rotation adjustment mechanism configured to adjust a rotational angle in an in-plane direction of the optical compensation plate included in the second optical compensation unit.

Thus, it is easy to optimize the compensation effect of the luminance irregularity.

In the liquid crystal display device according to the present technology, an optical compensation plate included in the first optical compensation unit may preferably be formed so as to be integrated with an optical compensation plate included in the second optical compensation unit.

Thus, it is possible to achieve a reduction in the number of components by integral molding and miniaturization of the optical system.

In the liquid crystal display device according to the present technology, an optical compensation plate included in the first optical compensation unit and an optical compensation plate included in the second optical compensation unit may preferably be formed so as to be separated as separate optical compensation plates.

Thus, for example, the degree of disposition of the compensation plates can be improved, for example, by separately disposing the optical compensation plate included in the first optical compensation unit and the optical compensation plate included in the second optical compensation unit before and after the liquid crystal panel along an optical path from the light source, and by separately disposing some of the optical compensation plates among the optical compensation plates and the other optical compensation units before and after the liquid crystal panel along the optical path and separately disposing the optical compensation plates included in the second optical compensation unit before and after the liquid crystal panel when the number of optical compensation plates included in the first optical compensation unit is plural.

In the liquid crystal display device according to the present technology, one or all of an optical compensation plate included in the first optical compensation unit and an optical compensation plate included in the second optical compensation unit may be formed so as to be integrated with the liquid crystal panel or a polarization plate.

Thus, it is possible to achieve a reduction in the number of components by integral molding and miniaturization of the optical system.

DESCRIPTION OF EMBODIMENTS

Hereinafter, an embodiment of the present technology will be described in the following order with reference to the appended drawings.

<1. Configuration of liquid crystal display device>
<2. First optical compensation unit (tilted light compensation)>
<3. Second optical compensation unit (luminance irregularity suppression)>
<4. Modification examples>
<5. Conclusion of embodiment>
<6. Present technology>

<1. Configuration of Liquid Crystal Display Device>

Figure 1:
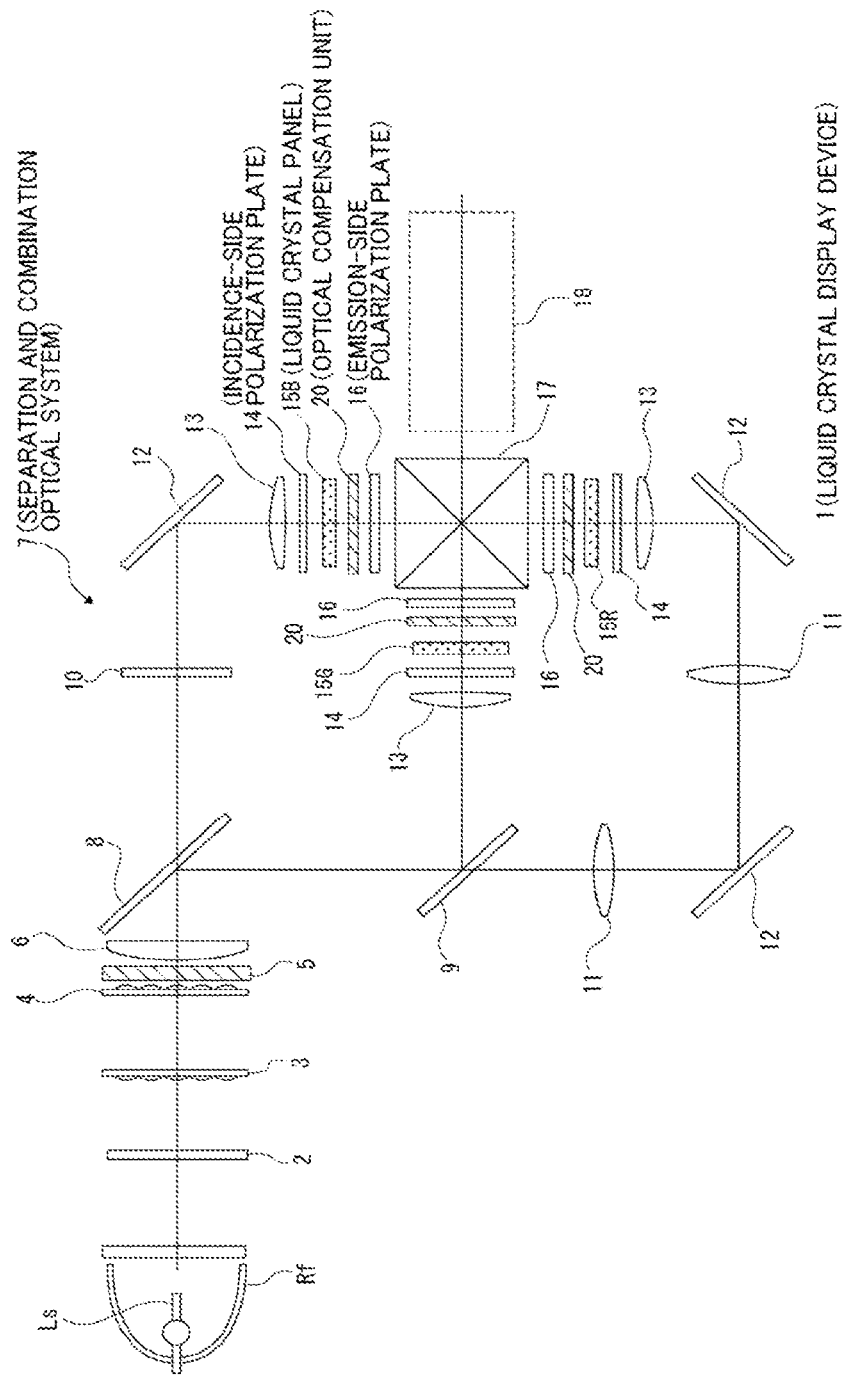
FIG. 1 is a diagram illustrating a configuration example of a liquid crystal display device according to a first embodiment.

FIG. 1 is a diagram illustrating a configuration example of a liquid crystal display device 1 according to the embodiment of the present technology. The liquid crystal display device 1 is configured as a transmissive liquid crystal projector device and is specifically configured as a so-called three-plate type liquid crystal projector device including liquid crystal panels corresponding to red (R), green (G), and blue (B).

As illustrated, the liquid crystal display device 1 includes a light source Ls, a reflector Rf, a filter 2, a fly-eye lens 3, a fly-eye lens 4, a polarization conversion element 5, a capacitor lens 6, a separation and combination optical system 7, and a projection lens (projection optical system) 18.

As the light source Ls, for example, a high intensity discharge (HID) lamp, a light-emitting diode (LED), a laser, or the like can be used. In the drawing, a configuration in which the reflector Rf is provided to correspond to a case in which the HID lamp is used in the light source Ls is exemplified. However, when an LED or a laser is used, the reflector RF is not essential. The light source Ls is disposed at a focal position of the reflector Rf. Light emitted from the light source Ls is reflected by the reflector Rf and exits as substantially parallel light.

As described above, emitted light which comes from the light source Ls, is reflected by the reflector Rf, and is substantially parallel light is incident on the polarization conversion element 5 via the filter 2 cutting infrared light and ultraviolet light and then via the fly-eye lens (first fly-eye lens) 3 and the fly-eye lens (second fly-eye lens) 4.

The fly-eye lenses 3 and 4 function as lenses that uniformize illuminance of light incident on liquid crystal panels 15 (15R, 15G, and 15B) to be described below. The polarization conversion element 5 aligns polarization axes of the emitted light in a predetermined direction. In this example, light including s-polarized light and p-polarized light is incident and the s-polarized light is emitted.

The light emitted from the polarization conversion element 5 is incident on the separation and combination optical system 7 via the capacitor lens 6. The capacitor lens 6 condenses the light which is emitted from the polarization conversion element 5 and is incident.

In the separation and combination optical system 7, the light emitted from the capacitor lens 6 is separated into red, green, and blue (RGB), spatial light modulation is performed on the light of respective colors to be combined in the liquid crystal panels 15 of the corresponding colors among the liquid crystal panels 15R, 15G, and 15B, and a projection image is formed by the combined light.

The separation and combination optical system 7 includes a dichroic mirror 8, a dichroic mirror 9, a filter 10, a relay lens 11, a mirror 12, a capacitor lens 13, an incidence-side polarization plate 14, the liquid crystal panels 15, an emission-side polarization plate 16, an optical compensation unit 20, and a color (light) combination prism 17. Transmissive liquid crystal panels are used as the liquid crystal panels 15. Three liquid crystal panels, the liquid crystal panel 15R that performs spatial light modulation on light with a red wavelength bandwidth (hereinafter referred to as "R light"), the liquid crystal panel 15G that performs spatial light modulation on light with a green wavelength bandwidth (hereinafter referred to as "G light"), and the liquid crystal panel 15B that performs spatial light modulation on light with a blue wavelength bandwidth (hereinafter referred to as "B light"), are provided.

In the separation and combination optical system 7, a set of the incidence-side polarization plate 14, the optical compensation unit 20, and the emission-side polarization plate 16 is provided for each of the liquid crystal panels 15R, 15G, and 15B.

The dichroic mirrors 8 and 9 each selectively transmit or reflect RGB light depending on the wavelength bandwidth. The dichroic mirror 8 transmits the B light and reflects the R and G light. When the R and G light reflected by the dichroic mirror 8 is incident, the dichroic mirror 9 transmits the R light and reflects the G light.

In this way, the light emitted from the capacitor lens 6 is separated into light of three colors RGB.

As illustrated, the B light passing through the dichroic mirror 8 is reflected by the mirror 12 via the filter 10 and is incident on the incidence-side polarization plate 14 provided to correspond to the liquid crystal panel 15B via the capacitor lens 13.

The G light reflected by the dichroic mirror 9 is incident on the incidence-side polarization plate 14 provided to correspond to the liquid crystal panel 15G via the capacitor lens 13.

The R light passing through the dichroic mirror 9 is reflected by the mirror 12 via the relay lens 11, and then is incident on the incidence-side polarization plate 14 provided to correspond to the liquid crystal panel 15R via the relay lens 11 and the capacitor lens 13.

The light of RGB each separated in this way is incident on the liquid crystal panel 15 of the corresponding color among the liquid crystal panels 15R, 15G, and 15B via the incidence-side polarization plate 14.

The light of RGB passing each of the liquid crystal panels 15R, 15G, and 15B is subjected to optical compensation (phase shift compensation) by the optical compensation unit 20 to be described below, and then is incident on the emission-side polarization plate 16. The amount of light emitted from the emission-side polarization plate 16 is adjusted depending on the degree of optical modulation in the liquid crystal panel 15.

The color combination prism 17 is configured to transmit the G light to emit the G light to the projection lens 18 and reflect the R and B light to emit the R and B light to the projection lens 18. The color combination prism 17 is configured by joining a plurality of glass prisms (four rectangular isosceles prisms with substantially the same shape) and two interference filters that have predetermined optical characteristics are formed on the joining surface of each glass prism. A first interference filter reflects the B light and transmits the R and G light. A second interference filter reflects the R light and transmits the G and B light. Accordingly, the light of RGB optically modulated by the liquid crystal panels 15R, 15G, and 15B is combined by the color combination prism 17 and is incident on the projection lens 18.

The projection lens 18 expands the light emitted from the separation and combination optical system 7 at a predetermined magnification and projects an image to a projection medium such as a screen.

Figure 2:
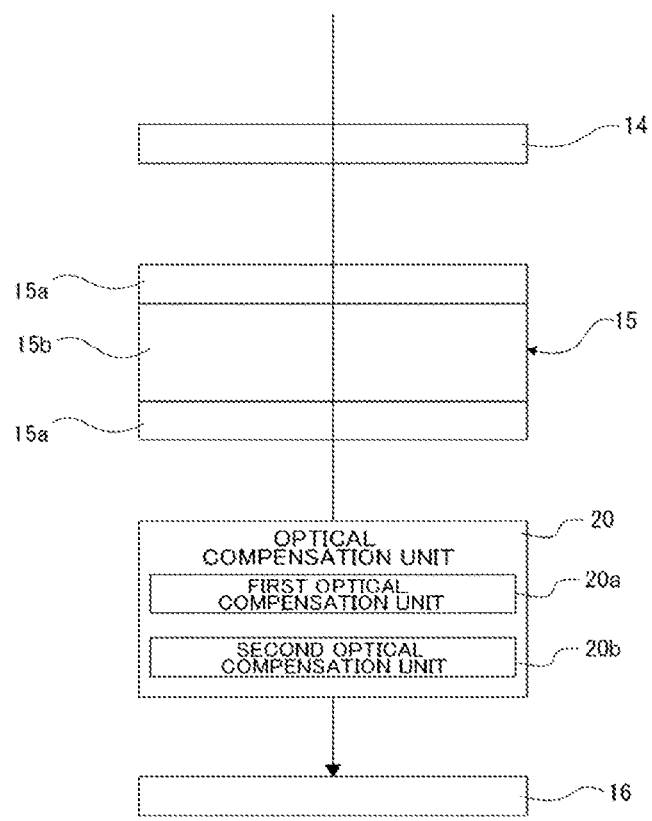
FIG. 2 is a diagram illustrating a configuration example of main units in the liquid crystal display device according to the first embodiment.

FIG. 2 is a diagram illustrating a configuration example of main units in the liquid crystal display device 1. A portion from the incidence-side polarization plate 14 to the emission-side polarization plate 16 provided for each color of RGB in the separation and combination optical system 7 is enlarged.

Along each optical path of RGB light, the incidence-side polarization plate 14 and the emission-side polarization plate 16 are disposed in a crossed Nicol state (a state in which optical axes are perpendicular to each other). The optical compensation unit 20 and the liquid crystal panel 15 serving as a spatial optical modulator are disposed between the incidence-side polarization plate 14 and the emission-side polarization plate 16. In the embodiment, the optical compensation unit 20 is disposed between the liquid crystal panel 15 and the emission-side polarization plate 16.

In this example, the optical compensation unit 20 includes a first optical compensation unit 20*a* and a second optical compensation unit 20*b*. The first optical compensation unit 20*a* is a compensation unit that compensates for a phase of light passing through the liquid crystal panel 15, and in particular, compensates for a phase difference occurring in tilted light passing through the liquid crystal panel 15 in this example.

The second optical compensation unit 20*b* is a compensation unit that suppresses luminance irregularity in black display.

The details of the first optical compensation unit 20*a* and the second optical compensation unit 20*b* will be described again.

The plurality of emission-side polarization plates 16 may be provided. The incidence-side polarization plate 14 and the emission-side polarization plate 16 may be organic polarization plates or inorganic polarization plates. In the case of inorganic polarization plates, for example, although a laser is used as the light source Ls and an amount of light from the light source Ls is large, deterioration can be suppressed (compared to the case of organic polarization plates), and thus a prolonged lifespan or an improvement in reliability can be achieved.

The liquid crystal panel 15 includes a liquid crystal layer 15*b* disposed between one pair of substrates 15*a* and functions as a spatial optical modulator for the transmitted light by changing alignment of liquid crystal in the liquid crystal layer 15*b* in accordance with an application voltage.

The liquid crystal panel 15 according to the embodiment is a vertical alignment (VA) type liquid crystal panel. The VA type liquid crystal panel operates in a vertical alignment mode. That is, when no voltage is applied, liquid crystal alignment is disposed to be substantially vertical to the substrate 15*a*. When a voltage is applied, the liquid crystal alignment is tilted in the vertical direction (a normal direction: a thickness direction) of the substrate 15*a*.

Figure 3:
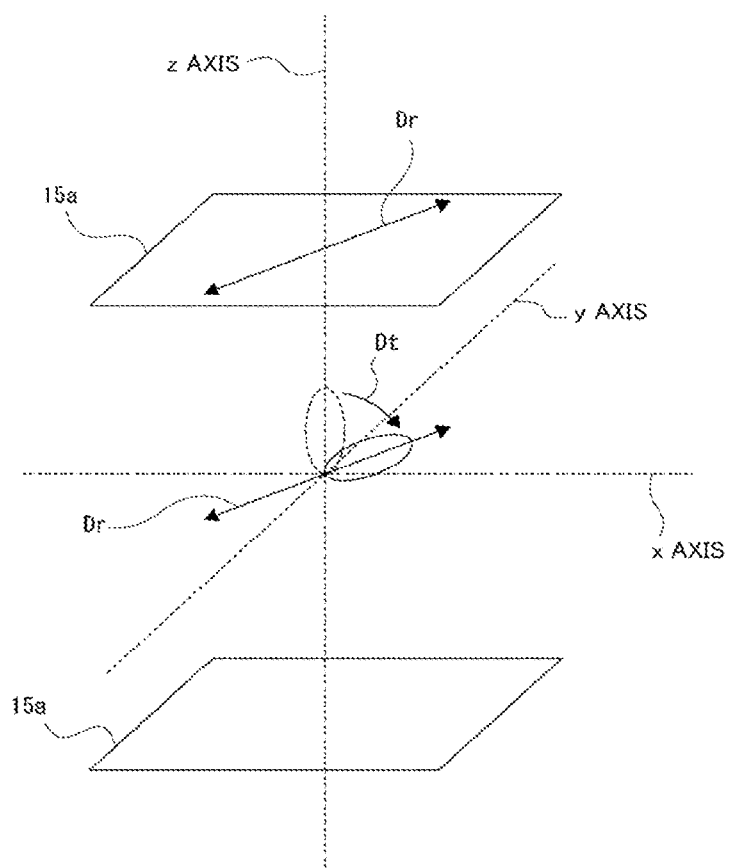
FIG. 3 is a diagram illustrating a tilting direction of liquid crystal.

FIG. 3 is a diagram illustrating a tilting direction of liquid crystal in the VA type liquid crystal panel.

First, as illustrated, a direction vertical to the substrate 15*a* of the liquid crystal panel 15 (the thickness direction of the liquid crystal panel 15) is defined as the z axis direction, and directions perpendicular to each other on a plane parallel to the in-plane direction of the substrate 15*a* are defined as the x and y axis directions.

As described above, in the VA type liquid crystal panel, the liquid crystal alignment is tilted in the vertical direction of the substrate 15*a* when a voltage is applied. At this time, a direction in which liquid crystal molecules are tilted is a direction oriented in an alignment direction of an alignment film formed in the substrate 15*a* (hereinafter referred to as a "rubbing direction Dr"). The rubbing direction Dr is a direction of 45 degrees or 135 degrees when the x axis direction is a direction of 0 degrees to 180 degrees and the y axis direction is a direction of 90 degrees to 270 degrees on an x-y plane (in the drawing, an example of the rubbing direction Dr=45 degrees is illustrated).

In FIG. 3, a form of a liquid crystal molecule is an ellipsoid indicated by a dashed line before a voltage is applied. A form of a liquid crystal molecule is an ellipsoid indicated by a solid line after the voltage is applied. Hereinafter, a direction in which a liquid crystal molecule is tilted in response to application of a voltage (a direction in which the liquid crystal molecule is rotated) is referred to as a "tilting direction Dt".

In the liquid crystal panel 15, in a vertical alignment state in which no voltage is applied to the liquid crystal layer 15*b* (pre-tilting to be described below is not considered here), linearly polarized light in the same polarization direction as linearly polarized light (in this example, s polarized light) in a predetermined polarization direction incident from the incidence-side polarization plate 14 is emitted from the liquid crystal layer 15*b* to the emission-side polarization plate 16 via the optical compensation unit 20.

Since the emission-side polarization plate 16 has a crossed Nicol relation with the incidence-side polarization plate 14, the polarization direction of light incident via the liquid crystal layer 15*b*, as described above, is substantially perpendicular to an optical transmission axis of the emission-side polarization plate 16 and the light does not pass through the emission-side polarization plate 16. That is, by causing pixels of the liquid crystal panel 15 to enter a voltage non-application state, pixel information (black) is displayed with a minimum grayscale value.

On the other hand, in a state in which a voltage is applied to the liquid crystal layer 15*b*, the liquid crystal molecule is tilted in the tilting direction Dt. At this time, by adjusting a voltage value of an application voltage, it is possible to control a slope angle of the liquid crystal molecule to the tilting direction Dt. When an application voltage value is maximum, the liquid crystal alignment becomes horizontal alignment (a state in which the liquid crystal molecule is tilted at 90 degrees in the tilting direction Dt from the z axis direction). In this state, after the linearly polarized light incident from the incidence-side polarization plate 14 passes through the liquid crystal layer 15*b* by birefringence of the liquid crystal layer 15*b*, the polarization direction is rotated by 90 degrees and the linearly polarized light passes through the emission-side polarization plate 16. Thus, pixel information is displayed with a maximum grayscale value. In a state in which a voltage value is less than a maximum value, the slope angle of the liquid crystal molecule in the tilting direction Dt is less than 90 degrees. In this state, the light passing through the liquid crystal layer 15*b* includes both a polarized component parallel to the polarization direction of incident light and a perpendicular polarized component (that is, elliptically polarized light). Of the two polarized components, only the polarized component parallel to the optical transmission axis of the emission-side polarization plate 16 is emitted from the emission-side polarization plate 16. Accordingly, in this case, pixel information is displayed with an intermediate grayscale value.

Here, in the actual liquid crystal panel 15, even when no voltage is applied, the liquid crystal alignment is not completely vertical to the substrate 15*a* and pre-tilting of about several degrees is given to the liquid crystal alignment.

Figure 4:
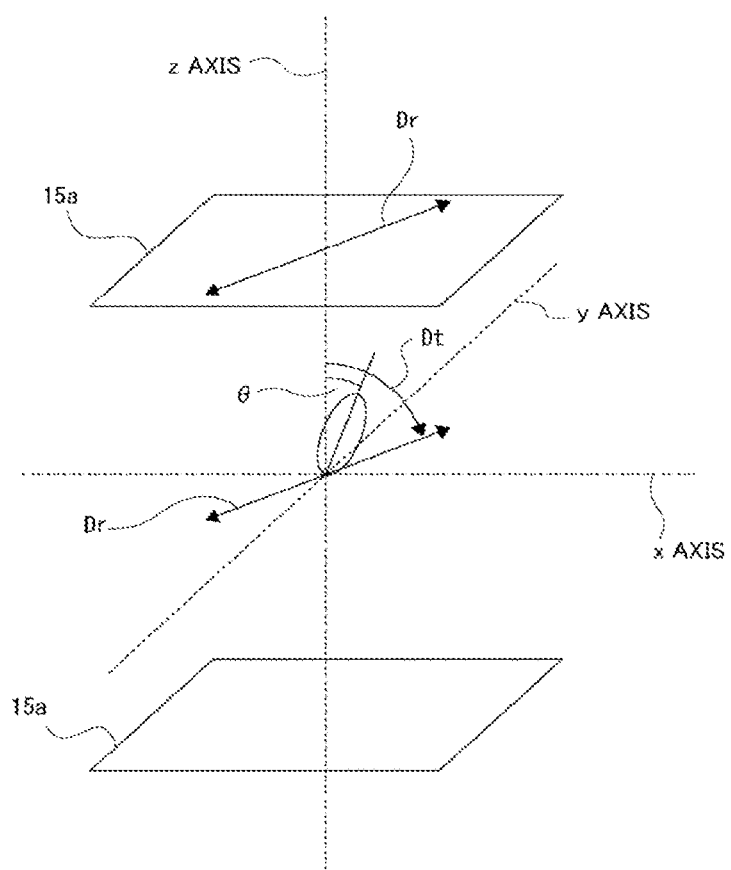
FIG. 4 is a diagram illustrating pre-tilting of liquid crystal.

FIG. 4 is a diagram illustrating pre-tilting of liquid crystal in the VA type liquid crystal panel.

In the liquid crystal panel 15, in a state in which no voltage is applied, a liquid crystal molecule in the liquid crystal layer 15*b* is tilted by a predetermined angle θ from the z axis direction to the tilting direction Dt. Hereinafter, a pre-tilting angle of liquid crystal represented by the angle θ is referred to as a "pre-tilting angle θ".

The pre-tilting prevents occurrence of a reverse tilting domain in which the liquid crystal molecule is tilted in a direction reverse to a predetermined direction (the tilting direction Dt) when a voltage is applied.

When the liquid crystal molecule is pre-tilted in this way, the light passing through the liquid crystal layer 15b includes not only a polarized component parallel to the polarization direction of the incident light but also a perpendicular polarized component in the voltage non-application state, that is, in the black display. Therefore, part of the light passing through the liquid crystal layer 15b may pass through the emission-side polarization plate 16, which causes light leakage in the black display, and thus contrast may deteriorate.

To achieve prevention of the light leakage in the black display, it is effective to dispose a negative C plate, that is, a medium with a small refractive index in its thickness direction, in the optical compensation unit 20.

The negative C plate used in this example (hereinafter referred to as a "negative C plate 23") is not configured with negative uniaxial crystal as in sapphire but is configured as a multilayer film structure formed of an inorganic material. The multilayer film structure is realized, for example, by forming multiple layers of an inorganic material on a transparent substrate formed of glass or the like by, for example, coating such as sputtering or deposition. As the negative C plate 23, the multilayer film structure can be formed by alternately stacking a high refractive index material and a low refractive index material formed of dielectric substances.

Figure 5:
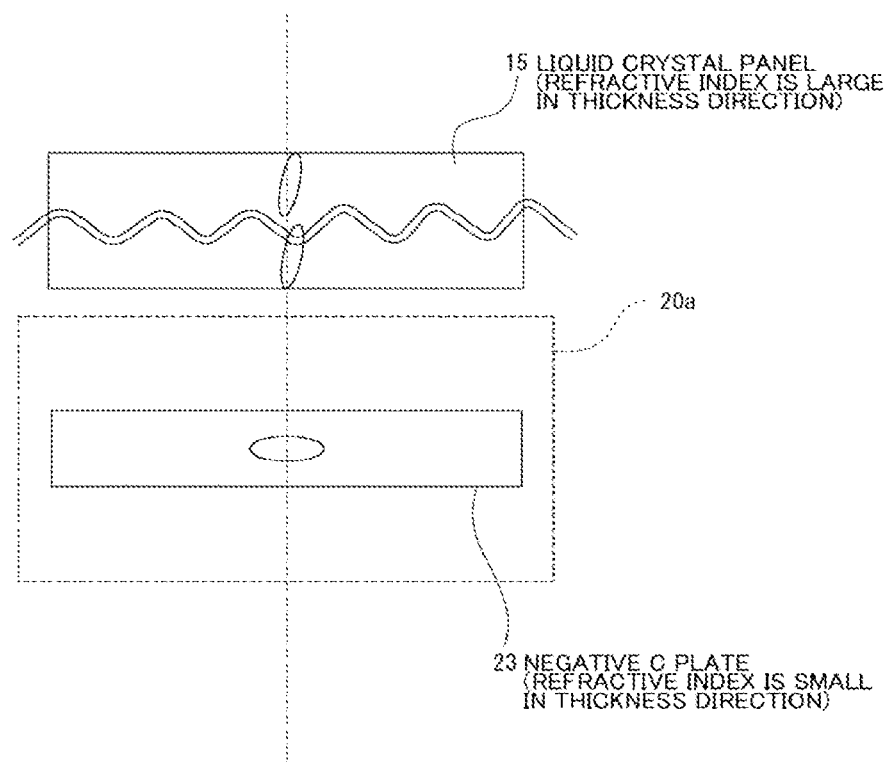
FIG. 5 is a diagram schematically illustrating an operational effect of a refractive index ellipsoid of a liquid crystal layer and an operational effect of a refractive index ellipsoid of a negative C plate.

An operational effect in a case in which the negative C plate 23 is provided will be described with reference to FIG. 5. FIG. 5 schematically illustrates an operation of a refractive index ellipsoid of the liquid crystal panel 15 (the liquid crystal layer 15b) and an operation of a refractive index ellipsoid of the negative C plate 23.

First, the VA type liquid crystal panel 15 can be modeled with positive uniaxial crystal since the liquid crystal layer 15b operates in a vertical alignment mode. That is, the liquid crystal panel 15 in which the liquid crystal molecules are tilted at the pre-tilting angle θ in the voltage non-application state can be ascertained as a tilted positive C plate. Here, the positive C plate is a medium in which an in-plane refractive index is isotropic and a refractive index in its thickness direction is greater than the in-plane refractive index (that is, a medium in which a refractive index is large in its thickness direction).

In the liquid crystal panel 15, it is considered that a medium in which a refractive index is small in the thickness direction is used as the negative C plate 23. Here, the medium in which the refractive index is small in the thickness direction can be said to be a medium in which an in-plane refractive index is isotropic and a refractive index in the thickness direction is less than the in-plane refractive index.

In the negative C plate 23 in which the refractive index is small in the thickness direction, a phase difference with an opposite sign to the phase difference of the liquid crystal panel 15 serving as the positive C plate occurs when a light beam passes.

Because of this, in the liquid crystal panel 15 and the negative C plate 23, when the optical axes are tilted in the same direction, a phase difference occurring in the liquid crystal panel 15 is directly reverse to a phase difference occurring in the negative C plate 23. Accordingly, with regard to the phase difference occurring in the liquid crystal panel 15 and the phase difference occurring in the negative C plate 23, when the thicknesses of the liquid crystal panel 15 and the negative C plate are adjusted so that absolute values of the thicknesses are the same and a phase shift does not occur between the incidence-side polarization plate 14 and the emission-side polarization plate 16 of the crossed Nicol, the phase difference occurring in the liquid crystal panel 15 can be offset by the phase difference occurring in the negative C plate 23.

That is, by disposing the negative C plate 23 obliquely in the same direction as the pre-tilting direction (the tilting direction Dt) of the liquid crystal panel 15 and adjusting the thicknesses, it is possible to offset the phase difference occurring in the liquid crystal panel 15.

Here, modeling will be described for easier understanding.

Figure 6:
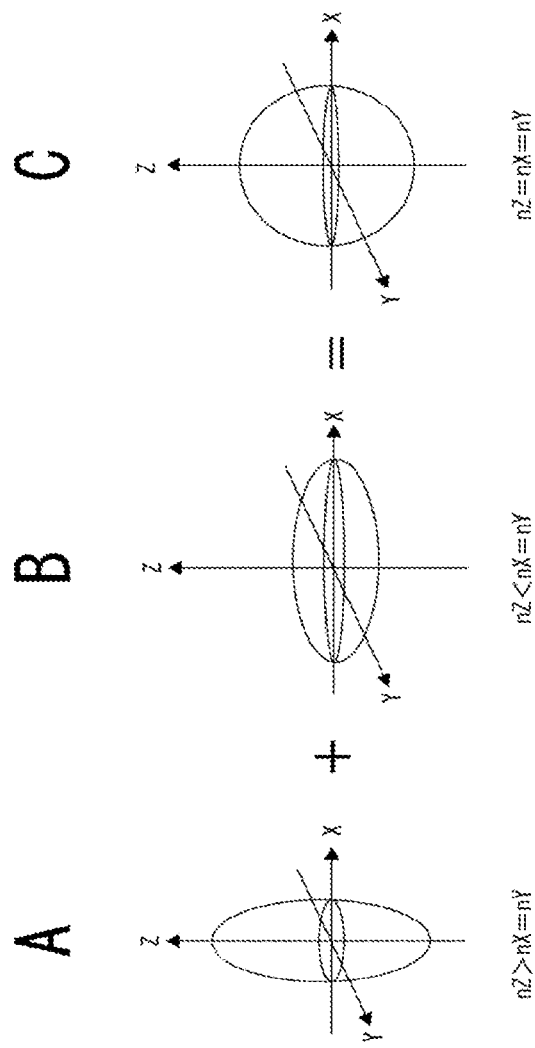
FIG. 6 is a diagram illustrating modeling of one specific example of optical compensation by the negative C plate.

FIG. 6 is a diagram illustrating modeling of one specific example of optical compensation by the negative C plate 23. FIG. 6A illustrates modeling of the liquid crystal panel 15, that is, a refractive index ellipsoid indicating positive uniaxial crystal, FIG. 6B illustrates modeling of the negative C plate 23, that is, a refractive index ellipsoid in which a refractive index is small in the thickness direction, and FIG. 6C illustrates modeling of a refractive index ellipsoid formed by adding the refractive index ellipsoids of FIGS. 6A and 6B together.

In each of FIGS. 6A to 6C, the X, Y, and Z axes represent 3-dimensional directions of a refractive index ellipsoid. When the negative C plate 23 is disposed to be tilted in the same direction as the tilting direction Dt, the X, Y, and Z axes are different from the x, y, and z axes illustrated in FIG. 3 or 4 (three axes in which the in-plane direction or the thickness direction of the liquid crystal panel 15 is a reference).

As described above, the liquid crystal molecules in the liquid crystal panel 15 are pre-tilted. Therefore, the Z axis in FIG. 6A is an axis tilted by the pre-tilting angle θ in the tilting direction Dt with respect to the z axis. The Z axis in FIG. 6B is identical with the Z axis in FIG. 6A. This means that the negative C plate 23 is tilted in the same direction (the rotation direction) as the pre-tilting with respect to a state parallel to the liquid crystal panel 15. Specifically, this means that the negative C plate 23 is tilted by the pre-tilting angle θ in the tilting direction Dt with respect to a state parallel to the liquid crystal panel 15. The foregoing description is fundamental, but in actual design, the pre-tilting angle θ is not identical strictly and a slight deviated value due to a difference in the refractive index between the material of the negative C plate and the liquid crystal.

In FIG. 6A, in the liquid crystal panel 15, that is, the refractive index ellipsoid indicating positive uniaxial crystal, refractive indexes no of an ordinary ray in the X and Y axis directions are equal to each other and a refractive index ne of an extraordinary ray in the Z axis direction is greater than the refractive index no of an ordinary ray (where no<ne). This can be expressed as "nZ>nX=nY" when refractive indexes n in the directions of the X, Y, and Z axes are "nX", "nY", and "nZ".

In the refractive index ellipsoid of the negative C plate 23 illustrated in FIG. 6B, the refractive indexes no of an ordinary ray in the X and Y axis directions are equal to each other and the refractive index ne of an extraordinary ray in the Z axis direction is less than the refractive index no of an ordinary ray (where no>ne). That is, "nZ<nX=nY" can be expressed in the relation of the refractive indexes "nX", "nY", and "nZ" of the directions of the X, Y, and Z axes.

When the refractive index ellipsoids illustrated in FIGS. 6A and 6B are added together, as illustrated in FIG. 6C, the refractive index ellipsoid is isotropic seemingly ("nZ=nX=nY"), the refractive indexes of an ordinary ray and an extraordinary ray are equal in light in any direction (where no=ne), and thus a phase difference does not occur. At this time, an amount of each phase difference is determined by "Δn (a difference between ne and no)×thickness". However, since Δn is determined in accordance with a physical property, an amount of the phase difference can be determined by adjusting the thickness.

<2. First Optical Compensation Unit (Tilted Light Compensation)>

As described above, by disposing the negative C plate 23 which is a medium with a small refractive index in the thickness direction obliquely in the same direction as the pre-tilting direction of the liquid crystal panel 15 and adjusting the thickness of the negative C plate 23, it is possible to offset a phase shift occurring the liquid crystal panel 15.

However, it is not preferable to dispose the negative C plate 23 obliquely because of an increase in the size of an optical system. Therefore, in this example, a compensation scheme in which the negative C plate 23 is not disposed obliquely is adopted.

Figure 7:
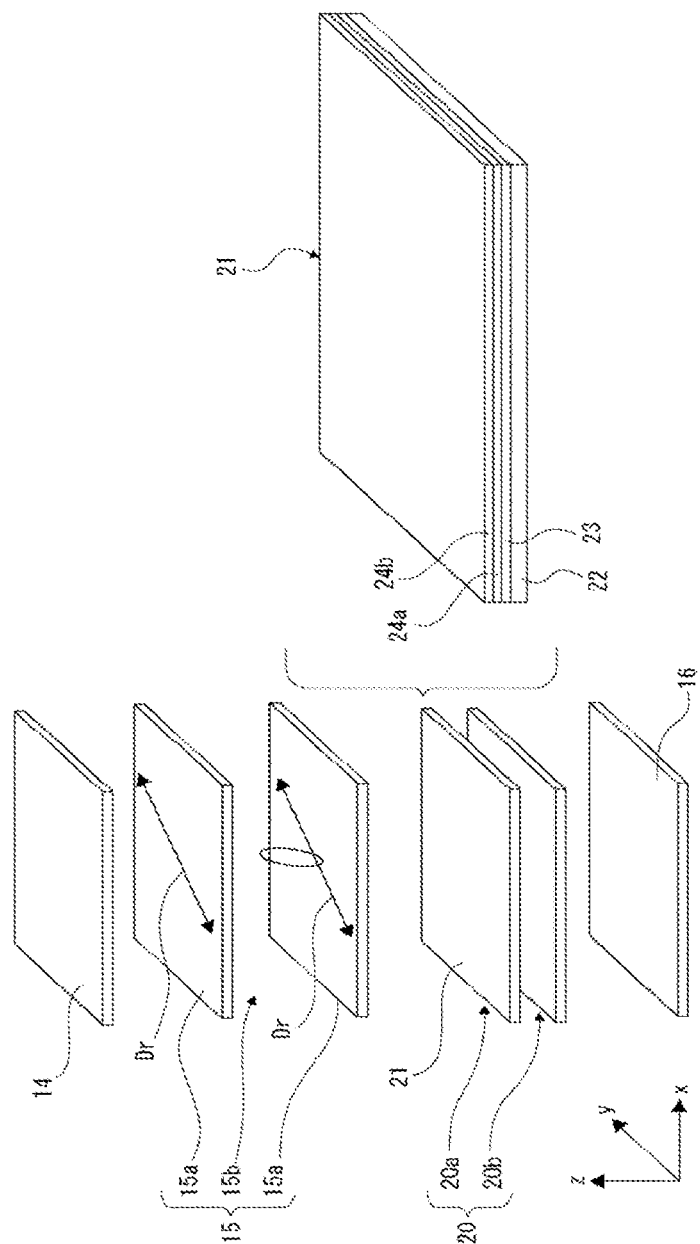
FIG. 7 is a diagram illustrating a configuration example of a first optical compensation unit according to an embodiment.

FIG. 7 is a diagram illustrating a configuration example of the optical compensation unit 20 according to the embodiment.

As illustrated in FIG. 7, two O plates, an O plate 24a and an O plate 24b, are provided along with the negative C plate 23 in the first optical compensation unit 20a of the optical compensation unit 20. Specifically, the first optical compensation unit 20a of this example is configured as, for example, one optical compensation plate 21 in which the negative C plate 23, the O plate 24a, and the O plate 24b are stacked on the transparent substrate 22 formed of glass or the like in this order on the side of the substrate 22.

Here, when the O plate is expressed as a refractive index ellipsoid, the O plate is an optical medium in which an N1 axis with the largest refractive index is tilted with respect to the thickness direction and is formed by forming a film by oblique vapor deposition.

In this example, the optical compensation plate 21 is disposed parallel to the liquid crystal panel 15.

Here, in the following description, when the two O plates 24a and 24b are not particularly distinguished from each other, the O plates 24a and 24b are referred to as the "O plates 24". The O plates 24a and 24b are also referred collectively to as "two O plates 24".

The optical compensation plate 21 is not limited to the configuration in which the two O plates 24 are stacked on the negative C plate 23 as in FIG. 7. It is also possible to adopt another configuration in which, for example, one compensation plate obtained by forming the O plate 24a on one of the front surface and the rear surface of a transparent substrate formed of glass or the like and forming the O plate 24b on the other surface is bonded to be integrated with one compensation plate obtained by forming the negative C plate 23 on the substrate 22. In the embodiment, the optical compensation plate 21 may have a configuration in which at least one negative C plate 23 and two O plates 24 are included.

Figure 8:
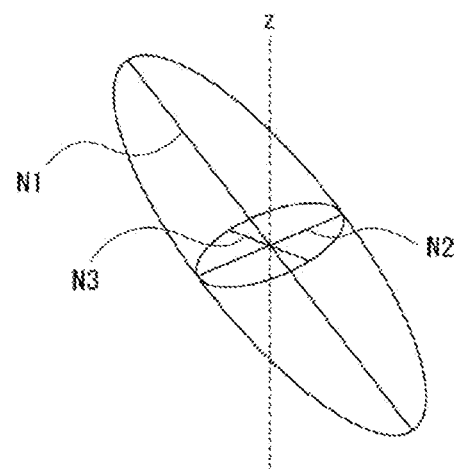
FIG. 8 is a diagram illustrating an expression of an O plate by a refractive index ellipsoid.

FIG. 8 is a diagram illustrating an expression of the O plate 24 by a refractive index ellipsoid.

As illustrated, in the refractive index ellipsoid of the O plate 24, the N1 axis with the largest refractive index is tilted with respect to the z axis direction.

In the refractive index ellipsoid of the O plate 24, the axes that have a perpendicular relation in the plane perpendicular to the N1 axis are N2 and N3 axes.

Here, as described, PTL 1 discloses a compensation plate in which two O plates and a negative C plate are combined. However, only an in-plane phase difference (=front phase difference) occurring from a refractive index ellipsoid projected to the O plate surface and a phase difference Rth in a thickness direction (in PTL 1, the both are defined as retardations) are not disclosed. Appropriate compensation of a tilted light component, that is, a component of light incident at an angle tilted in the thickness direction is not described. Although the forgoing front phase difference and phase difference Rth in the thickness direction are designed to match a phase difference occurring in liquid crystal, it is difficult to appropriately offset the phase difference occurring from tilted light at each incident angle.

In recent years, for example, in the liquid crystal display device 1 for business use, an angle of divergence of a lighting system becomes relatively large to improve brightness of a display image, and thus it is important to compensate for tilted light. Microlenses (MLs) are mounted in the liquid crystal panel 15 and angle of light passing through liquid crystal become large. Therefore, it is important to compensate for tilted light.

Accordingly, the embodiment proposes a scheme of appropriately offsetting a phase difference occurring in tilted light passing through the liquid crystal panel 15 in which liquid crystal is pre-tilted by using the foregoing optical compensation plate 21.

First, to compensate for a phase difference occurring due to pre-tilting of liquid crystal, the following conditions may be ideally satisfied to appropriately offset the phase difference occurring the tilted light. That is, the first optical compensation plate 21 may be configured to generate a phase difference that has a substantially equal amount and a reverse sign in light with each incidence angle within a predetermined incidence angle range on the liquid crystal panel 15 with respect to a phase difference occurring from the liquid crystal panel 15. More specifically, the first optical compensation plate 21 satisfies a condition that a combined phase difference of two O plates 24 and the negative C plate 23 (that is, a combined phase difference of the optical compensation plate 21) has the equal amount as that of the phase difference occurring from the liquid crystal panel 15 and the reverse sign in the light with the incidence angle within the predetermined incidence angle range on a cross-section in the tilting direction which is a cross-section parallel to the tilting direction Dt.

Figure 9:
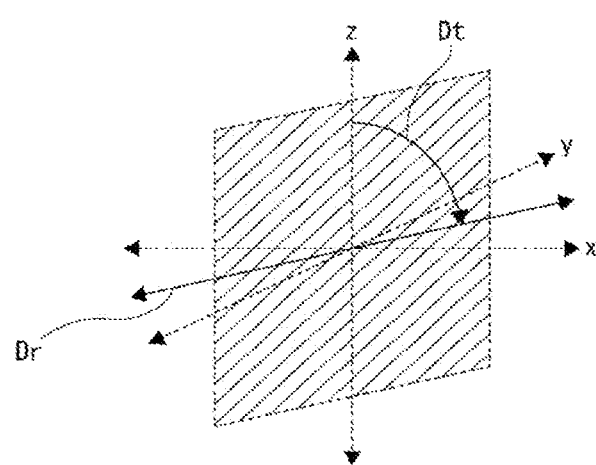
FIG. 9 is a diagram illustrating a cross-section in a tilting direction.

FIG. 9 is a diagram illustrating a "cross-section in a tilting direction" in the foregoing condition.

As illustrated, the cross-section in the tilting direction can be said to be a cross-section parallel to a rubbing direction Dr and the z axis direction (the thickness direction).

In the foregoing condition, the predetermined incidence angle range is a range of an incidence angle at which compensation is substantially necessary. That is, compensation for an incidence angle which cannot occur or does not mostly occur in a configuration of an actual optical system is excluded from the condition. In this example, the predetermined incidence angle range is, for example, a range in which an absolute value of an incidence angle (deg) is in a range equal to or less than 15 or equal to or less than 30.

Figure 10:
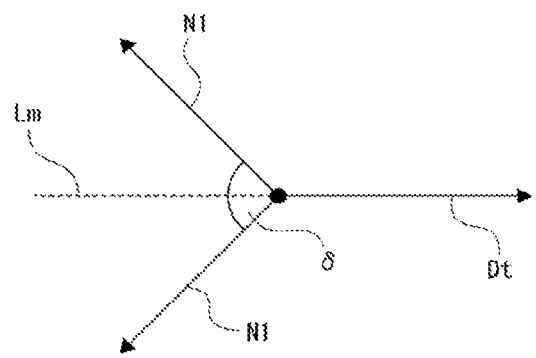
FIG. 10 is a diagram illustrating a setting example of a direction of an N1 axis in the O plate.

Here, to compensate for a phase difference occurring due to pre-tilting using the two O plates 24, as disclosed in PTL 1, the N1 axes of the two O plates 24 are appropriately oriented in directions illustrated in FIG. 10.

In FIG. 10, the directions of the N1 axes of the two O plates 24 indicated by "N1" in the drawing are expressed as directions when the N1 axes are projected to an x-y plane. Similarly, the tilting direction Dt illustrated in the drawing is expressed as a direction when the tilting direction is projected to the x-y plane. As illustrated, it is appropriate that an angle δ formed between the N1 axes of the two O plates 24 is 90 degrees and a central line Lm of the angle δ is oriented in a direction parallel and opposite to the tilting direction Dt.

In the optical compensation plate 21 of this example, the directions of the N1 axes of the two O plates 24 are set to substantially satisfy the condition, but do not strictly satisfy the condition.

On the foregoing premise, a scheme of matching a combined phase difference of the optical compensation plate 21 in tilted light will be described.

Figure 11:
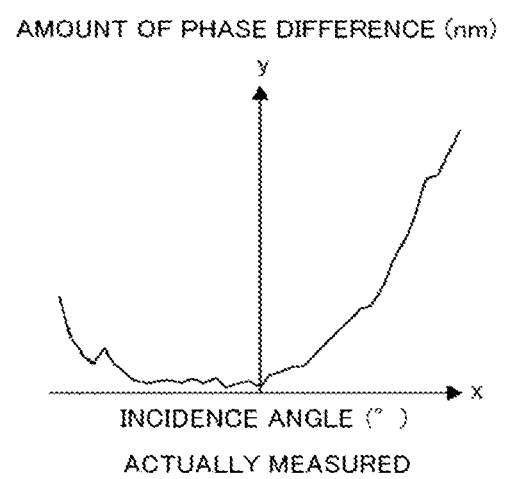
FIG. 11 is a diagram illustrating a result obtained by measuring an amount of a phase difference occurring in light passing through a liquid crystal panel.

FIG. 11 illustrates a result obtained by measuring an amount of a phase difference occurring in light passing (transmitting) through the liquid crystal panel 15 at each incidence angle on the cross-section in the tilting direction. Here, the range of the incidence angle is in the range of ±20 degrees to 0 degrees. In this way, change characteristics of an amount of phase difference with respect to the incidence angle in the liquid crystal panel 15 are not parabola, but can be approximated to a quardratic curve expressed in the following [Expression 1].

$$y = Ax^2 + Bx + C \quad \text{[Expression 1]}$$

Here, x is an incidence angle, y is an amount of a phase difference, and A>0, B>0, and C>0 are satisfied.

On the other hand, change characteristics of an amount of phase difference on the cross-section in the tilting direction of the negative C plate 23 can be expressed with a parabola in the following [Expression 2].

$$y = ax^2 \quad \text{[Expression 2]}$$

Here, a<0 is satisfied.

Further, the change characteristics of the combined phase difference on the cross-section in the tilting direction of the two O plates 24 are not a completely straight line, but can be linearly approximated in [Expression 3].

$$y = bx + c \quad \text{[Expression 3]}$$

Figure 12:
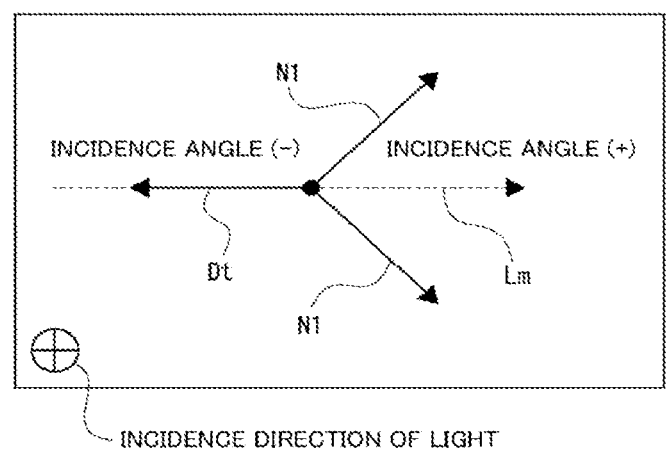
FIG. 12 is a diagram illustrating a definition example of a direction of incidence of light in the measurement of the amount of the phase difference.

Here, in [Expression 3], a sign (negative or positive) of the slope coefficient b is changed in accordance with a direction of sample measurement. In this example, as illustrated in FIG. 12, an incidence direction of light is defined (a mark indicating an incidence direction in the drawing means that light travels from the front side of the page surface to the rear side). In this case, b<0 is satisfied for the slope coefficient b. In [Expression 3], c<0 is satisfied for the intercept c.

Figure 13:
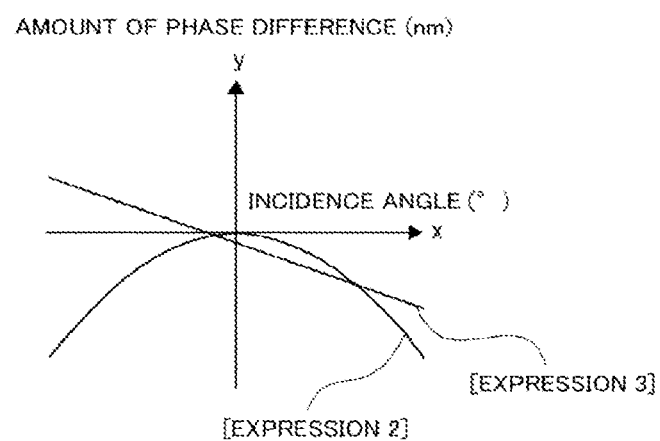
FIG. 13 is a diagram illustrating a graph that shows examples of phase difference change characteristics of a negative C plate and composite phase difference change characteristics of two O plates with respect to an incidence angle.

FIG. 13 illustrates a graph that shows [Expression 2] and [Expression 3].

The change characteristics of the combined phase difference of the optical compensation plate 21, that is, the combined phase difference of the two O plates 24 and the one negative C plate, can be expressed as the following [Expression 4] in which [Expression 2] and [Expression 3] are added together.

$$y = ax^2 + bx + c \quad \text{[Expression 4]}$$

Figure 14:
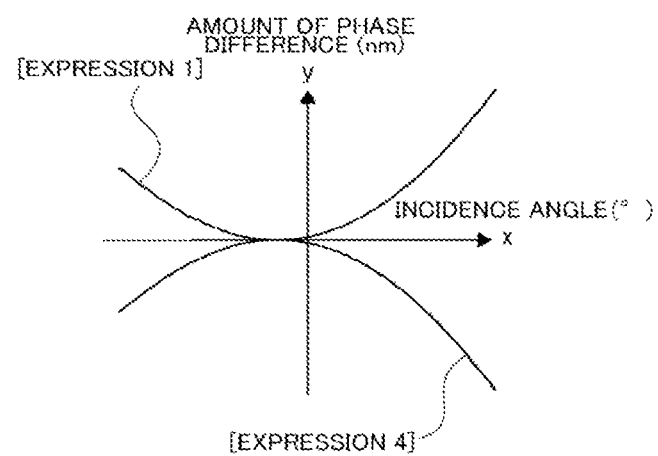
FIG. 14 is a diagram illustrating a graph that shows phase difference change characteristics of a liquid panel side and composite phase difference change characteristics of an optical compensation plate side with respect to an incidence angle.

FIG. 14 illustrates a graph that shows [Expression 4] and [Expression 1].

From this drawing, to offset the phase difference occurring from tilted light by the combined phase difference of the optical compensation plate 21, a curve on the side of the liquid crystal panel 15 expressed in [Expression 1] has a vertical inversion relation with a curve of the combined phase difference expressed in [Expression 4].

That is, the condition of the following [Expression 5] may be satisfied.

$$A > 0, B > 0, C > 0, a < 0, b < 0, c < 0, |A| = |a|, |B| = |b|, |C| = |c| \quad \ldots \text{[Expression 5]}$$

The condition of [Expression 5] means that the absolute value of the amount of phase difference is equal and the sign is reverse.

Based on the foregoing [Expression 1] to [Expression 5], for a certain incidence angle, a target amount of phase difference can be obtained with the negative C plate 23 and a target amount of combined phase difference can be obtained with the two O plates 24.

For example, first, an incidence angle and an amount of phase difference of the liquid crystal panel 15 (that is, x and y) are sampled at three points and A, B, and C are obtained by substituting the three points into [Expression 1]. From the condition of [Expression 5], a, b, and c are obtained.

By substituting a into [Expression 2], a target amount of phase difference can be obtained with the negative C plate 23.

By substituting b and c into [Expression 3], a target amount of combined phase difference is obtained with the two O plates 24.

Here, actually, since an error occurs in measurement or simulation, a may be first determined rather than directly substituting x and y of three points and solving simultaneous equations as in the foregoing scheme. As a reference for a method of determining a in this case, a may be obtained by matching the value of y so that an amount of phase difference occurring from the liquid crystal which is not pre-tilted at a certain incidence angle (x=15 degrees) is obtained. That is, an amount of phase difference of the negative C plate 23 is matched with the liquid crystal in advance. In this case, [Expression 3] obtained by subtracting [Expression 2] from [Expression 4] is the target amount of combined phase difference in the two O plates 24.

However, even when a is roughly guessed, it is necessary to consider the following condition.

$$y\_Max = 0 \quad \text{[Expression 6]}$$

The phase difference of the liquid crystal is theoretically 0 when viewed in the direction in which the liquid crystal is pre-tilted, it is necessary for the optical compensation plate 21 to have a phase difference of 0 at that incidence angle. Here, [Expression 4] is modified to the following [Expression 7].

[Math. 1]

$$y = a\left(x^2 + \frac{b}{a}x + \frac{c}{a}\right) \quad \text{[Expression 7]}$$
$$= a\left\{\left(x + \frac{b}{2a}\right)^2 - \frac{b^2}{4a^2} + \frac{c}{a}\right\}$$

Accordingly, a point at which y become Max is x=−b/2a.

At this time, given y=0, y=0 and x=−b/2a are substituted into [Expression 7].

[Math. 2]
$$0 = a\left\{\left(-\frac{b}{2a} + \frac{b}{2a}\right)^2 - \frac{b^2}{4a^2} + \frac{c}{a}\right\}$$
$$0 = -\frac{b^2}{4a} + c$$

Then, $c = b^2/4a$                                       [Expression 8]

When the value of a is substituted into [Expression 4], an expression, b, c, x, and y is formed. This expression is referred to as [Expression 4']. When desired x and y are substituted into [Expression 4'], an expression of b and c is formed and referred to as [Expression 4"].

When a is substituted into [Expression 8], [Expression 8'] of b and c is formed. When [Expression 8'] is substituted into [Expression 4"], an expression of only b is formed. After b is obtained, c is obtained.

It is apt to consider c as a front phase difference of the liquid crystal. Thus, rather than considering that c=front phase difference occurring from the pre-tilting of the liquid crystal at x=0, the value of c may be determined so that the condition of [Expression 8] is satisfied. When the value of c is too large without considering the condition of [Expression 8], the value of y Max becomes negative, and thus an unnecessary phase difference occurs.

Here, since an error occurs in simulation or actual measurement, several samples may be generated and checked near a target phase difference obtained in accordance with the foregoing scheme.

The scheme of appropriately offsetting the phase difference occurring from the tilted light has been described above. However, in phase compensation for light passing through the liquid crystal panel 15, it should be considered that the pre-tilting angle θ can vary from a designed value.

For a variation in the pre-tilting angle θ, there are a High panel in which falling of liquid crystal is smaller and a Low panel in which falling of liquid crystal is larger when a Typical panel of a design center is a reference. For example, when an amount of phase difference is matched to the Typical panel, a phase difference is matched to a pinpoint. Therefore, deterioration in contrast occur in the other liquid crystal panel 15.

When the variation of the pre-tilting angle θ cannot be absorbed, the optical compensation plate 21 in which there is a phase difference of each of the Typical, High, and Low panels has to be generated, and thus it takes a time and cost increases.

Accordingly, according to the embodiment, unevenness of the compensation effect of the phase difference occurring from tilted light due to the variation in the pre-tilting angle θ is suppressed. In other words, the unevenness of the compensation effect can be absorbed.

Therefore, an amount of phase difference occurring at each incidence angle on a cross-section perpendicular to the cross-section in the tilting direction is noticed other than the cross-section in the tilting direction. Specifically, when the phase difference of the liquid crystal panel 15 is compared to the combined phase difference of the optical compensation plate 21 at the same incidence angle on the positive side and the negative side on the cross-section perpendicular to the cross-section in the tilting direction, a magnitude relation between the absolute value of the phase difference at the incidence angle of the positive side and an absolute value of the phase difference at the incidence angle of the negative side is set to be matched between the side of the liquid crystal panel 15 and the side of the optical compensation plate 21 (the side of the combined phase difference). In other words, in the foregoing comparison, when the phase difference of the liquid crystal panel 15 is larger on the positive side, the combined phase difference of the optical compensation plate 21 is also set to be larger on the positive side. Conversely, in the foregoing comparison, when the phase difference of the liquid crystal panel 15 is larger on the negative side, the combined phase difference of the optical compensation plate 21 is also set to be larger on the negative side.

In this way, on the side of the liquid crystal panel 15 and the side of the optical compensation plate 21, a tendency of the phase difference occurring at the incidence angle on the positive side and the phase difference occurring at the incidence angle of the same absolute value on the negative side is aligned.

Here, even in this case, for the incidence angle, a predetermined incidence angle range in which compensation is actually necessary (for example, a range equal to or less than 15 degrees and equal to or less than 30 degrees of the absolute value) is set as a target.

Since the phase difference occurring due to the pre-tilting of the liquid crystal is compensated for with the O plates 24 (when the liquid crystal is not tilted, the phase difference can be compensated for with only the negative C plate 23), it is apt to notice the phase difference in a direction in which the liquid crystal is to be tilted (the phase difference on the cross-section in the tilting direction). By also considering a phase difference in a direction in which the liquid crystal is not tilted, specifically, a phase difference on a cross-section perpendicular to the cross-section in the tilting direction, it is possible to achieve a further increase in the contrast.

A simulation showing in which condition the tendency of the phase differences on the side of the liquid crystal panel 15 and the side of the optical compensation plate 21 is changed was confirmed.

When the phase difference of the liquid crystal in the tilting direction Dt matches that of the two O plates 24 based on the above-described expression, three parameters are used. That is, a tilting angle of the N1 axis and a film thickness of the O plate 24 and an angle δ formed by the two O plates 24 are used. Of them, there is not much the degree of freedom of the slope angle of the N1 axis because there is restriction on a deposition device or a jig. When the film thicknesses of the two O plates 24 are set to be substantially the same, new adjustment is the angle δ formed by the two O plates 24. For example, a simulation was performed by fixing the direction of the N1 axis of one of the two O plates 24 and rotating the other O plate 24 in a plane. As a result, when the angle δ (twist angle) formed by the N1 axes of the two O plates 24 is less than 80 degrees, the tendency of the phase difference on the cross-section perpendicular to the cross-section in the tilting direction was reversed between the panel and the compensation plate (at this time, the refractive indexes of the O plates 24 was calculated as N1>N2>N3). That is, the magnitude relation between the absolute value of the phase difference at the incidence angle on the positive side and the absolute value of the phase difference at the incidence angle on the negative side was reversed between the side of the liquid crystal panel 15 and the side of the optical compensation plate 21. At this time, the phase difference on the cross-section in the tilting direction was generally matched.

The foregoing twist angle is exemplary. When the refractive indexes of the O plates 24 formed by a deposition material are changed, an optimum angle δ for absorbing irregularity is changed. The optimum angle δ is also changed by setting the thickness film of each O plate 24. An important point is that the tendency of the phase difference on the cross-section perpendicular to the cross-section in the tilting direction is also matched when the phase difference on the cross-section in the tilting direction is matched.

By adopting this scheme, the absorption of the unevenness of the compensation effect caused due to the variation in the pre-tilting angle θ can absorbed. Actually, an experiment was carried out by forming two O plates 24 and one negative C plate 23 on separate substrates, superimposing a total of three compensation plates to measure phase differences. In actual measurement, when the angle δ formed by the two O plates 24 was changed, it was confirmed that the same change as that of the simulation occurred.

In this example, LCD MASTER manufactured by Shintech, Inc. was used in the simulation. In the actual measurement of the phase differences, AxoScan manufactured by AXOMETRICS, Inc. was used (measured in Total Retardance).

The applicants of the present specification have repeated trial productions of the optical compensation plate 21 based on the above-described design ideas and realized the optical compensation plate 21 that has good compensation performance.

A contrast evaluation result of the optical compensation plate 21 will be described with reference to FIG. 15. Here, evaluation results of FIG. 15 and FIG. 16 to be described below are results when the second optical compensation unit 20b is not included in the optical compensation unit 20.

Figure 15:
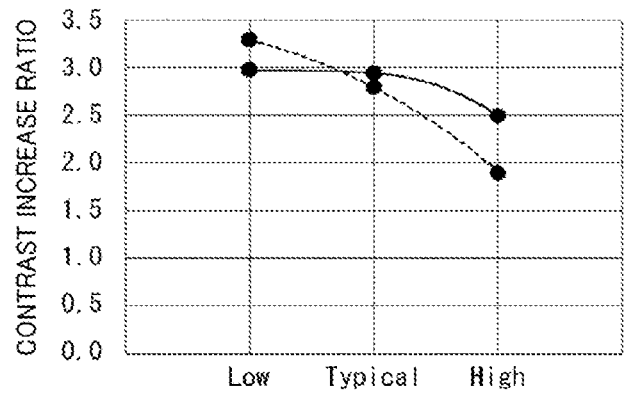
FIG. 15 is a diagram illustrating contrast evaluation result in an optical compensation device according to the embodiment.

In FIG. 15, a dashed line indicates a measurement result of a contrast increase ratio of the optical compensation plate 21 in which a phase difference on the cross-section in the tilting direction is optimized (that is, the phase difference occurring from the tilted light is offset) based on the above-described expression. Here, the contrast increase ratio is a value indicating an increase ratio of contrast when base contrast, that is, contrast in case in which the optical compensation unit 20 does not compensate for a phase, is set to "1".

A solid line in the drawing indicates a measurement result of a contrast increase ratio of the optical compensation plate 21 in which a phase difference on the cross-section in the tilting direction is optimized and a formed angle δ is optimized (a phase difference on the cross-section perpendicular to the cross-section in the tilting direction is optimized).

Figure 16:
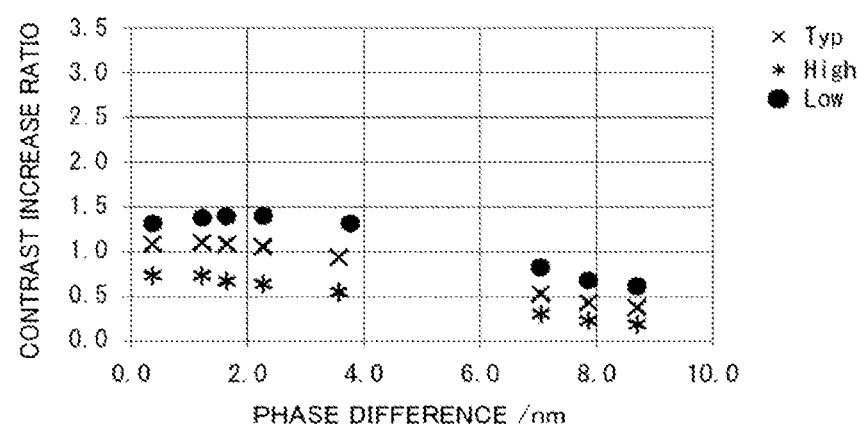
FIG. 16 is a diagram illustrating contrast evaluation result generated based on a scheme of a technology of the related art in an optical compensation device.

Here, to make comparison, an evaluation result of contrast in the technology of the related art is illustrated in FIG. 16. FIG. 16 illustrates a contrast increase ratio in each of Typical, High, and Low panels when an amount of front phase difference described above is switched for samples generated based on the scheme of using two O plates disclosed in PTL 1. In each sample used in FIG. 16, the phase difference Rth in the thickness direction was matched with the phase difference Rth in the liquid crystal panel 15 and an amount of phase difference of the negative C plate was determined to be constant.

In FIG. 16, in the scheme of matching only the front phase difference as in PTL 1, the contrast increase ratio is about 1.4 in the Low panel, about 1.2 in the Typical panel, and about 0.7 in the High panel at most.

On the other hand, as indicated by the dashed line in FIG. 15, in the case of the optical compensation plate 21 in which only the scheme of optimizing the phase difference on the cross-section in the tilting direction is adopted, the contrast increase ratio is about 3.3 in the Low panel, about 2.8 in the Typical panel, and about 1.9 in the High panel.

As indicated by the solid line in the drawing, in the case of the optical compensation plate 21 in which the phase difference on the cross-section in the tilting direction and the phase difference on the cross-section perpendicular to the cross-section in the tilting direction are optimized, the contrast increase ratio is about 3.0 in the Low panel, about 3.0 in the Typical panel, and about 2.5 in the High panel.

From the foregoing results, it can be understood that an improvement can be achieved in the contrast by optimizing the phase difference on the cross-section in the tilting direction and appropriately offsetting the phase difference occurring from tilted light.

It can be understood that irregularity of the compensation effect for the phase difference occurring from tilted light can be absorbed by optimizing the phase difference on the cross-section perpendicular to the cross-section in the tilting direction. According to the result of FIG. 15, it can be understood that, in this case, the contrast increase ratio which is 2.5 times or more can be guaranteed even in the High panel while maintaining about 3.0 in the Typical panel and the Low panel.

Here, it is assumed that characteristics of the optical compensation plate 21 are represented by an approximate expression indicated by [Expression 3] when contrast performance indicated by the solid line of FIG. 15 is obtained. As described above, this approximate expression is an approximate expression obtained by linearly approximating change characteristics of a combined phase difference at an incidence angle with regard to a combined phase difference of two O plates 24 on the cross-section in the tilting direction.

Figure 17:
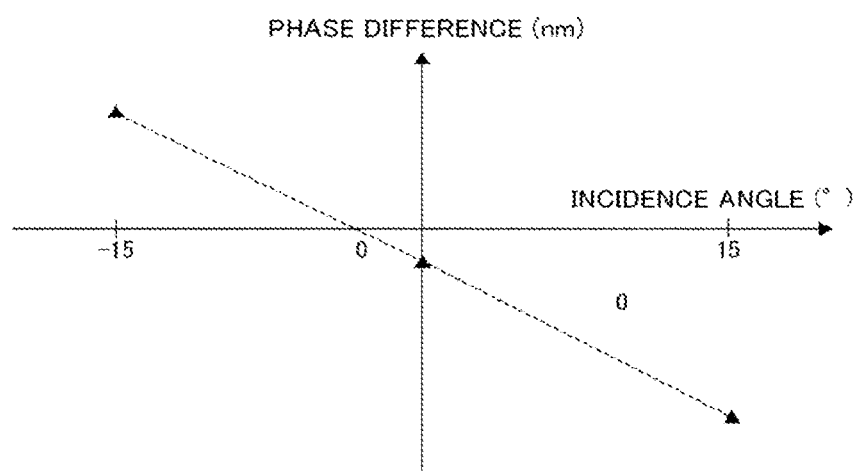
FIG. 17 is a diagram illustrating a graph of an example of an approximate expression indicating characteristics of the optical compensation device according to the embodiment.

In the approximate expression for the optical compensation plate 21 in which the evaluation result indicated by the solid line of FIG. 15, the absolute value of the slope coefficient b was 0.5 when a significant figure is the first decimal place. At this time, the intercept c in the approximate expression is a negative since the sign of the phase difference of the liquid crystal panel 15 is positive. FIG. 17 is a diagram illustrating a graph of the approximate expression in this case.

The foregoing slope coefficient b is obtained by actually measuring a phase difference and linearly approximating actual measurement results of three points when an incident angle is set to 15 degrees, 0 degrees, and −15 degrees in a sample of the target optical compensation plate 21. An actually measured value of the slope coefficient b is set to a positive value although there is a difference from the actual measurement due to a difference in simulation conditions.

At this time, in the actual measurement of the phase difference, the above-described AxoScan was used (measured in Total Retardance).

On the other hand, when the scheme of matching the front phase difference illustrated in FIG. 16 is adopted, the absolute value of the slope coefficient b in the approximate expression in the optimization of the amount of front phase difference was 0.7 under the condition that the significant figure is the first decimal place similarly.

Here, when a panel design is different, a designed value of the pre-tilting angle θ of liquid crystal can also be different. When the pre-tilting angle θ is different, an optimum value of the slope coefficient b is also changed. When a designed value of the pre-tilting angle θ which can be adopted in panel design is assumed to be relatively narrow and irregularity of the actual pre-tilting angle θ with respect to the designed value is assumed to be relatively narrow, the absolute value of the slope coefficient b is preferably equal to or less than 0.6 which is a median value in the case of FIGS. 16 and 15. Here, b≠4 is satisfied (since an amount of phase difference is changed with a change in the incidence angle). When the designed value of the pre-tilting angle θ which can be adopted in the panel design is assumed to be relatively broad and the irregularity of the actual pre-tilting angle θ with respect to the designed value is assumed to be relatively broad, the absolute value of the slope coefficient b is preferably equal to or less than 0.65 other than 0.

When the evaluation result indicated by the solid line of FIG. 15 can be obtained, an amount of phase difference of the negative C plate at the incidence angle of 15 degrees is about 10 nm. In consideration of a difference in the panel design, the amount of phase difference of the negative C plate at the incidence angle of 15 degrees is preferably equal to or less than 20 nm which is its double.

Here, the example in which the two O plates 24 and the negative C plate 23 are formed so as to be integrated as the single optical compensation plate 21 has been given as a configuration example of the first optical compensation unit 20a, but some or all of the two O plates 24 and the negative C plate 23 may be separated to another compensation plate.

Figure 18:
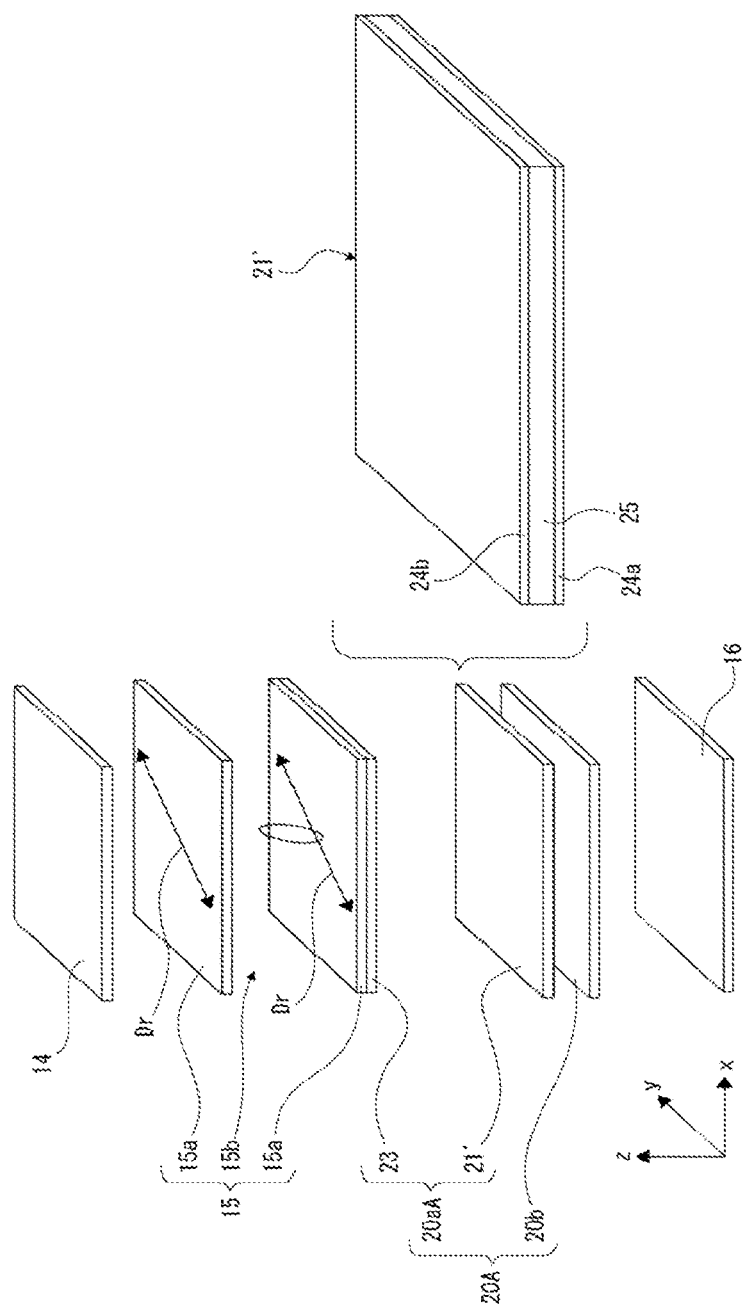
FIG. 18 is a diagram illustrating a modification example in which some or all of two O plates and a negative C plate are formed so as to be separated into other compensation plates.

FIG. 18 illustrates its example.

As illustrated, in the optical compensation unit 20A in this case, the negative C plate 23 and an optical compensation plate 21' are configured to be separated as indicated as a first optical compensation 20aA. In this case, the negative C plate 23 is formed so as to be integrated with a substrate 15a (the substrate 15a closer to the emission-side polarization plate 16 between two substrates 15a) in the liquid crystal panel 15. The optical compensation plate 21' is located between the negative C plate 23 and the emission-side polarization plate 16 and, as illustrated, has a configuration in which an oblique vapor deposition layer serving as an O plate 24a and an oblique vapor deposition layer serving as an O plate 24b are formed on the front and rear surfaces of a common substrate 25.

Although description will be omitted with reference to the drawing, at least some of the O plate 24a, the O plate 24b, and the negative C plate 23 are not limited between the liquid crystal panel 15 and the emission-side polarization plate 16, but can also be disposed between the liquid crystal panel 15 and the incidence-side polarization plate 14. For example, it is considered that a compensation plate in which the two O plates 24 are formed as in the optical compensation plate 21' of FIG. 18 is disposed between the liquid crystal panel 15 and the emission-side polarization plate 16 and a compensation plate in which the negative C plate 23 is formed is disposed between the liquid crystal panel 15 and the incidence-side polarization plate 14. Alternatively, it is considered that a compensation plate in which the O plate 24a is formed and a compensation plate in which the O plate 24b is formed are separately disposed between the liquid crystal panel 15 and the emission-side polarization plate 16 and between the liquid crystal panel 15 and the incidence-side polarization plate 14, and a compensation plate in which the negative C plate 23 is formed is disposed between the liquid crystal panel 15 and the emission-side polarization plate 16 or between the liquid crystal panel 15 and the incidence-side polarization plate 14. At this time, one of the O plates 24 and the negative C plate 23 may be integrated.

FIG. 18 illustrates the example in which the negative C plate 23 is formed so as to be integrated with the liquid crystal panel 15, but some of all of the negative C plate 23, the O plate 24a, and the O plate 24b can also be formed so as to be integrated with one of the liquid crystal panel 15, the incidence-side polarization plate 14, and the emission-side polarization plate 16.

Figure 19:
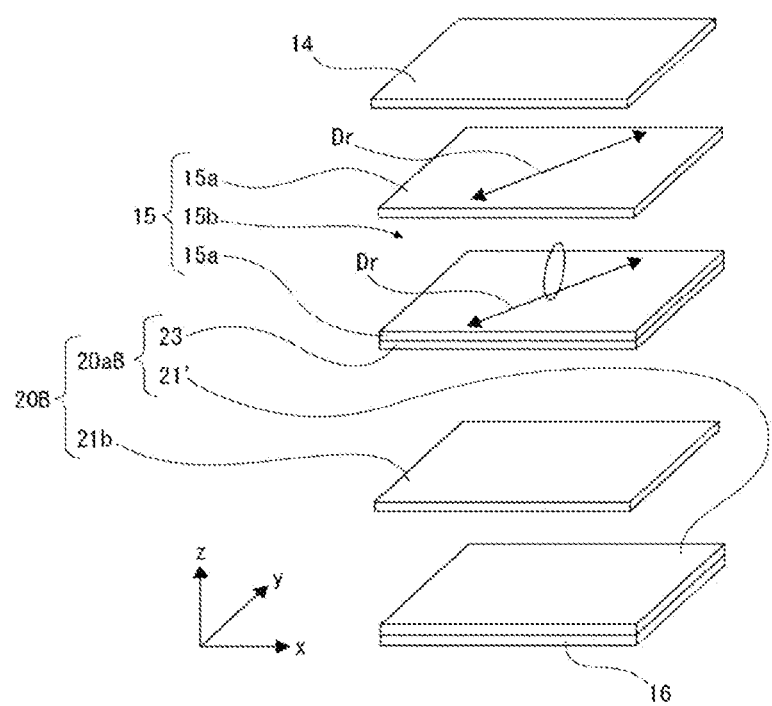
FIG. 19 is a diagram illustrating a modification example in which some of the optical compensation plates included in a first optical compensation unit are formed so as to be integrated with a polarization plate.

In FIG. 19, as an example, the negative C plate 23 is formed so as to be integrated with the substrate 15a closer to the emission-side polarization plate 16 in the liquid crystal panel 15 and an optical compensation unit 20B including a first optical compensation unit 20aB in which the optical compensation plate 21' is formed so as to be integrated with the emission-side polarization plate 16 is exemplified.

The first optical compensation unit 20a can also have another configuration, for example, in which three plates, the negative C plate 23 and two O plates 24, are formed so as to be integrated with the emission-side polarization plate 16 (or the incidence-side polarization plate 14) or the liquid crystal panel 15 (the substrate 15a).

<3. Second Optical Compensation Unit (Luminance Irregularity Suppression)>

Next, the second optical compensation unit 20b will be described.

As described above, the second optical compensation unit 20b serves as a compensation unit for achieving suppression of luminance irregularity in black display. To achieve the suppression of the luminance irregularity, the second optical compensation unit 20b in this example includes an optical compensation plate that generates a phase difference in an in-plane direction (hereinafter referred to as a "second optical compensation plate 30").

Representative examples of an optical medium that generates a phase difference in an in-plane direction include a so-called A plate (A-plate) that has refractive index anisotropy in the in-plane direction and an optical element that generates a phase difference because of a minute periodic uneven structure.

Figure 20:
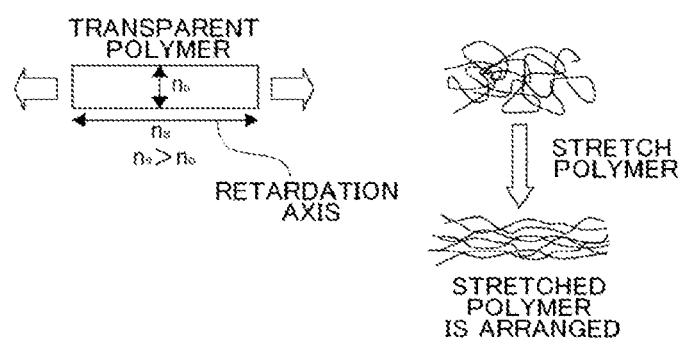
FIG. 20 is a diagram illustrating an A plate.
Figure 20:
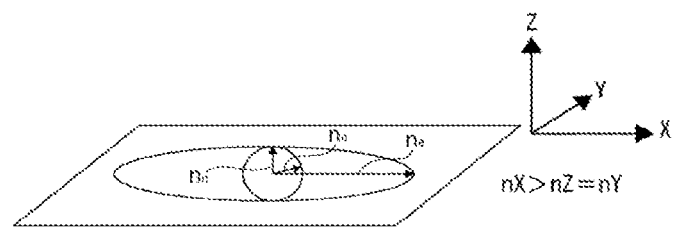

Here, the A plate that is generally commercialized is generated by extending a film with an organic material. Specifically, in the A plate, as schematically illustrated in FIG. 20A, a transparent polymer is stretched in a direction intersecting its thickness at right angles by extending the transparent polymer film in one direction. Thus, the stretched transparent polymer is arranged in the film.

FIG. 20B schematically illustrates characteristics of the A plate with a refractive index ellipsoid.

The A plate generated as described above has an optical axis (a slow axis) in the extending direction.

As illustrated, in the A plate, refractive indexes no of ordinary rays in the Z and Y axes are mutually equal and a refractive index ne of an extraordinary ray in the X axis direction is greater than the refractive index no of the ordinary ray (where no<ne). That is, the refractive index anisotropy of the A plate can be expressed as "nX>nZ=nY".

Such an A plate has the refractive index anisotropy in the in-plane direction since the refractive index nX in the X axis direction is different from the refractive index nY in the Y axis direction in the in-plane direction.

Here, since the A plate is formed of an organic material, there is concern of deterioration over time. Accordingly, in this example, the second optical compensation plate 30 is formed of an inorganic material.

A phase difference layer that has a slow axis in the X axis direction can be coated by, for example, vapor deposition or sputtering.

When the phase difference layer of the second optical compensation plate 30 is generated by coating of an inorganic material, it is generally easy to cause the refractive index to differ between the X and Z axis directions. However, it is difficult to cause the refractive indexes in the Z and Y axis directions to be equal while the refractive index differs between the X and Z axis directions. That is, it is difficult to realize uniaxial refractive index anisotropy expressed as "nX>nZ=nY" as in the A plate.

Figure 21:
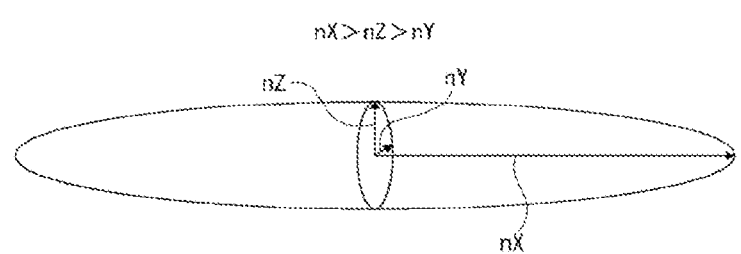
FIG. 21 is a diagram illustrating biaxial refractive index anisotropy.
Figure 21:
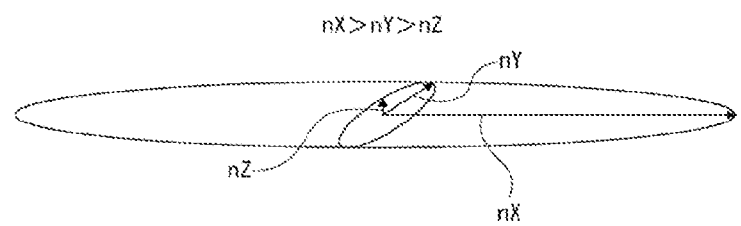

Accordingly, in this example, an optical compensation plate that has biaxial refractive index anisotropy is used as the second optical compensation plate 30. Specifically, as illustrated in FIGS. 21A and 21B, the second optical compensation plate 30 that has refractive index anisotropy expressed as "nX>nZ>nY" or "nX>nY>nZ" is used.

Thus, the second optical compensation plate 30 that has the refractive index anisotropy at least in the in-plane direction can be realized easily using an inorganic material.

Of course, the A plate (extended film) can also be used in the second optical compensation plate 30.

The second optical compensation plate 30 can also be configured to have refractive index anisotropy in the in-plane direction by combining a plurality of O plates or have refractive index anisotropy by devising a crystal panel cutting angle.

Further, a relation of the refractive indexes nX, nY, and nZ in the second optical compensation plate 30 is not limited to the above-exemplified relation and "nX=nZ>nY" can also be used.

In the second optical compensation plate 30, an optical element that has a minute periodic uneven structure with a nano-size on the surface of glass or the like to generate a phase difference in the in-plane direction can also be used.

Figure 22:
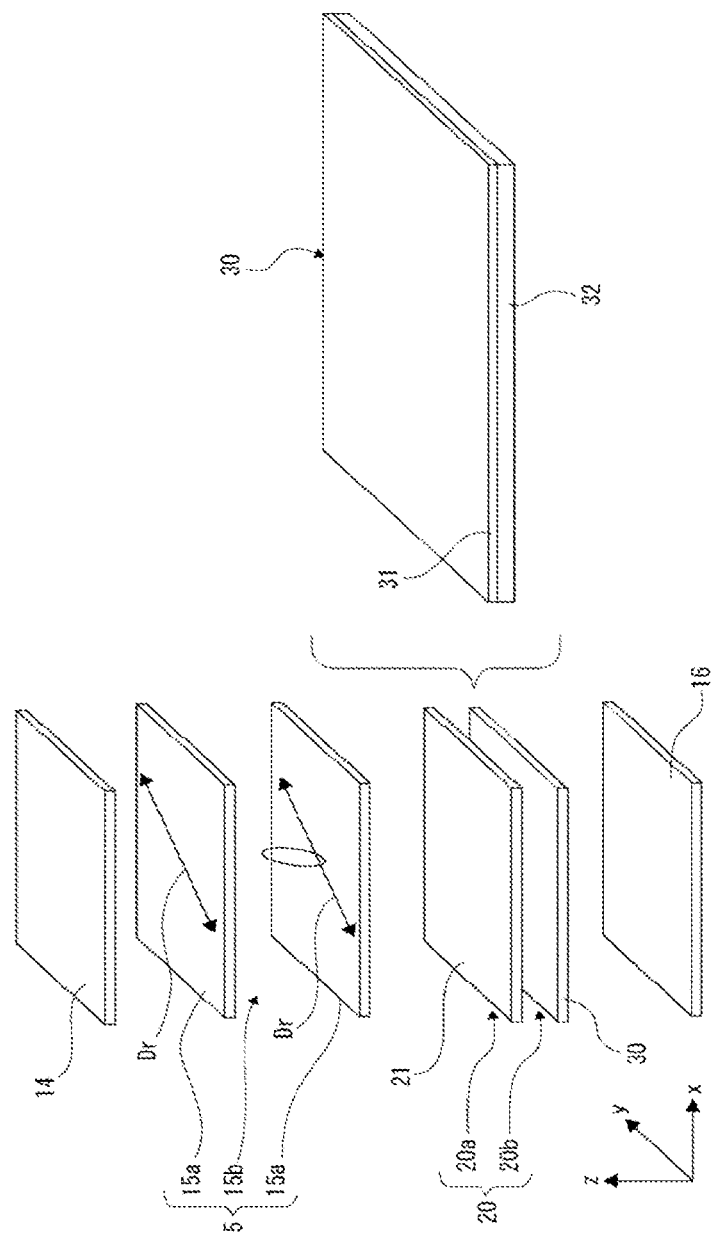
FIG. 22 is a diagram illustrating a configuration example of a second optical compensation unit according to the embodiment.

FIG. 22 illustrates a configuration example of the second optical compensation plate 30 that has the second optical compensation unit 20b in this example. As illustrated, the second optical compensation plate 30 is configured, for example, such that a phase difference layer 31 that has refractive index anisotropy in the in-plane direction is stacked on the transparent substrate 32 formed of glass.

In this example, the phase difference layer 31 is formed of an inorganic material and the phase difference layer 31 is stacked on a substrate 32 by coating the inorganic material by, for example, sputtering or vapor deposition.

Figure 23:
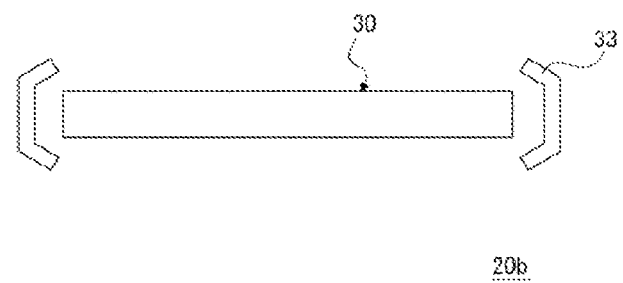
FIG. 23 is a diagram schematically illustrating a configuration of a rotation adjustment mechanism corresponding to the configuration of FIG. 22.

Here, although not illustrated in FIG. 22, the second optical compensation unit 20b in this example includes a rotation adjustment mechanism 33 that causes the second optical compensation plate 30 to keep rotatable, as illustrated in the schematic view of FIG. 23. The rotation adjustment mechanism 33 is configured to be able to adjust a rotation angle in the in-plane direction of the second optical compensation plate 30.

By providing the rotation adjustment mechanism 33 as described above, it is possible to adjust a direction of the optical axis in the in-plane direction of the second optical compensation plate 30 even after the second optical compensation plate 30 is embedded in an optical system.

In the embodiment, the suppression of the luminance irregularity in black display is achieved by the phase difference generated in the in-plane direction by the second optical compensation plate 30. At this time, however, when the direction of the optical axis of the second optical compensation plate 30 is not appropriate, there is concern of the suppression effect of the luminance irregularity due to generation of an extra phase difference.

Therefore, in this example, a rotation angle in the in-plane direction of the second optical compensation plate 30 is adjusted so that the direction of an axis in which a refractive index in the second optical compensation plate 30 (the phase difference layer 31) is the largest matches a direction near a direction parallel to a polarization direction of incident light (light incident on the second optical compensation plate 30) or near a direction orthogonal thereto.

Although the direction of the optical axis of the second optical compensation plate 30 is matched as described above, actually, an in-plane or out-of-phase difference occurs including a magnitude relation between the refractive index nX and the refractive indexes nY and nZ in some cases. Therefore, when a direction in which the optical axis is oriented is not appropriate, there is concern of contrast deteriorating.

It is preferable to actually measure and ascertain the direction in which the optical axis of the second optical compensation plate 30 is appropriate by simulation or with a sample. By providing the above-described rotation adjustment mechanism 33, it is possible to facilitate searching of the appropriate direction of the optical axis.

When the refractive indexes of the second optical compensation plate 30 satisfy "nX>nZ>nY" or "nX=n>Z>nY", it is preferable to increase an amount of phase difference indicating the refractive index of (nX+nY)/2>nZ as in the negative C plate and compensate for the phase difference in the thickness direction.

Here, as described above, in FIG. 22, the configuration in which the second optical compensation plate 30 is separate as a separate compensation plate from the optical compensation plate 21 included in the first optical compensation unit 20a has been exemplified. However, as will be described as the optical compensation unit 20C in FIG. 24, the optical compensation plate 21 and the second optical compensation plate 30 can also be configured as an integrated compensation plate.

Figure 25:
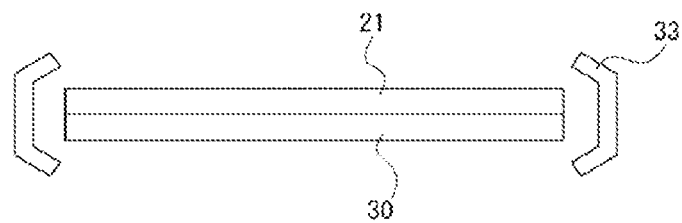
FIG. 25 is a diagram schematically illustrating a configuration of a rotation adjustment mechanism corresponding to the configuration of FIG. 24.

In this case, when an in-plane rotation angle of the second optical compensation plate 30 is adjusted, as illustrated in the schematic diagram of FIG. 25, a compensation plate in which the optical compensation plate 21 and the second optical compensation plate 30 are integrated is configured to be maintained rotatably as the rotation adjustment mechanism 33.

Figure 26:
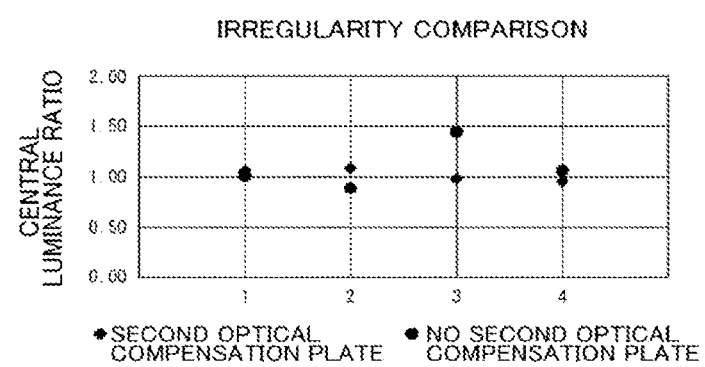
FIG. 26 is a diagram illustrating an evaluation result related to luminance irregularity in black display.
Figure 27:
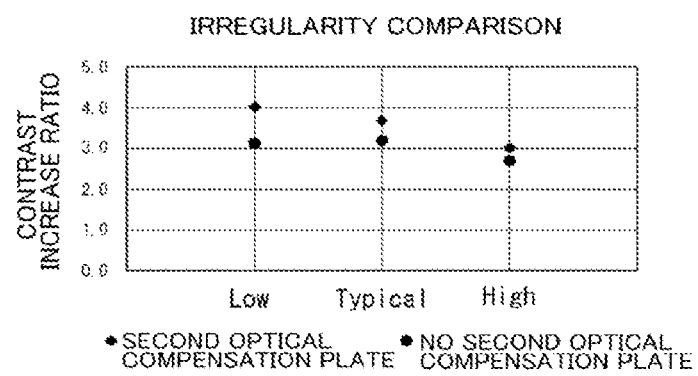
FIG. 27 is a diagram illustrating an evaluation result related to contrast.

FIGS. 26 and 27 illustrate an evaluation result related to luminance irregularity in black display and an evaluation result related to contrast in the liquid crystal display device 1 including the above-described second optical compensation plate 30.

Figure 28:
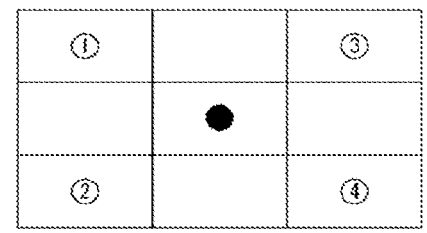
FIG. 28 is a diagram illustrating a central luminance ratio.

FIG. 26 illustrates a value of a central luminance ratio as an evaluation value of luminance irregularity. The central luminance ratio is a value indicating a ratio of a luminance value (for example, a central luminance value such as an average luminance value) in a target area to a luminance value of a central area (an area indicated by a black circle in the drawing) when a screen is divided into a plurality of areas (at least 9 areas), as illustrated in FIG. 28. In FIG. 26, a central luminance ratio in each of four corner areas (in the drawing, areas with numbers 1 to 4) upon division into the nine areas is shown when there is the second optical compensation plate 30 (in the drawing, mark ◆) and there is no second optical compensation plate 30 (in the drawing, mark ●).

In FIG. 27, a contrast increase ratio in each of the Low, Typical, and High panels is shown when there is the second optical compensation plate 30 (in the drawing, mark ◆) and there is no second optical compensation plate 30 (in the drawing, mark ●). As described for confirmation, the clause "no second optical compensation plate" in FIG. 27 means that only the second optical compensation plate 30 is excluded from the optical compensation unit 20 (that is, there is the first optical compensation unit 20a).

Figure 24:
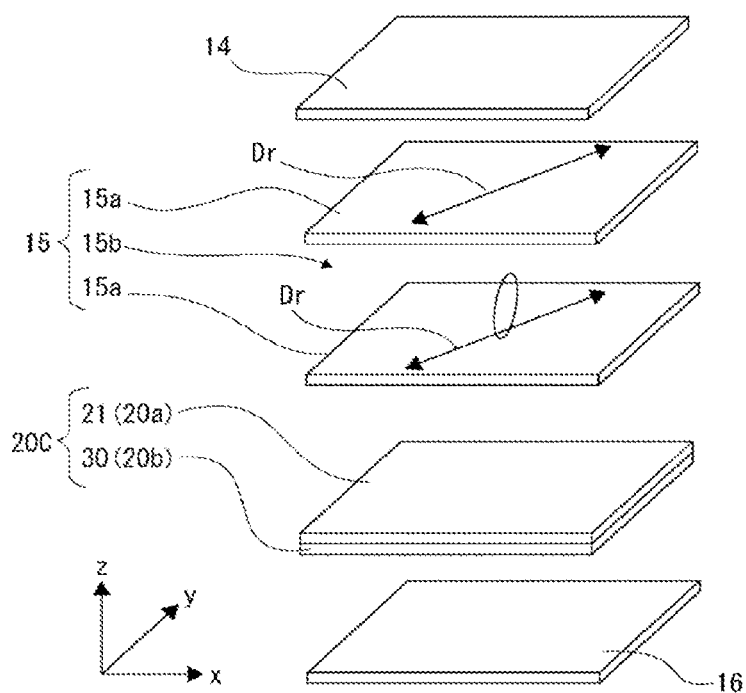
FIG. 24 is a diagram illustrating an example in which the optical compensation plates included in the first optical compensation unit and the optical compensation plates included in the second optical compensation unit are formed so as to be integrated.

Here, results of FIGS. 26 and 27 are results when the optical compensation plate 21 and the second optical compensation plate 30 are formed so as to be integrated as in FIG. 24 and the amount of in-plane phase difference of the second optical compensation plate 30 (the phase difference layer 31) is set to 65 nm.

From the result of FIG. 26, it can be understood that irregularity is admitted in luminance in the four corners when the second optical compensation plate 30 is not provided, but the central luminance ratio of the four corners is closes to substantially 1 and the luminance irregularity is suppressed when there is the second optical compensation plate 30.

According to the result of FIG. 27, when there is the second optical compensation plate 30, it can be understood that a further improvement in the contrast is achieved than when the second optical compensation plate 30 is not provided. In this case, the improvement in the contrast is realized irrespective of the types of Low, Typical, and High panels. In particular, in the case of the Low panel, the contrast increase ratio is improved to about 1.0.

Here, the effects of the improvement in the contrast and the suppression in the luminance irregularity because of the second optical compensation plate 30 can be changed in accordance with an amount of in-plane phase difference of the second optical compensation plate 30.

Figure 29:
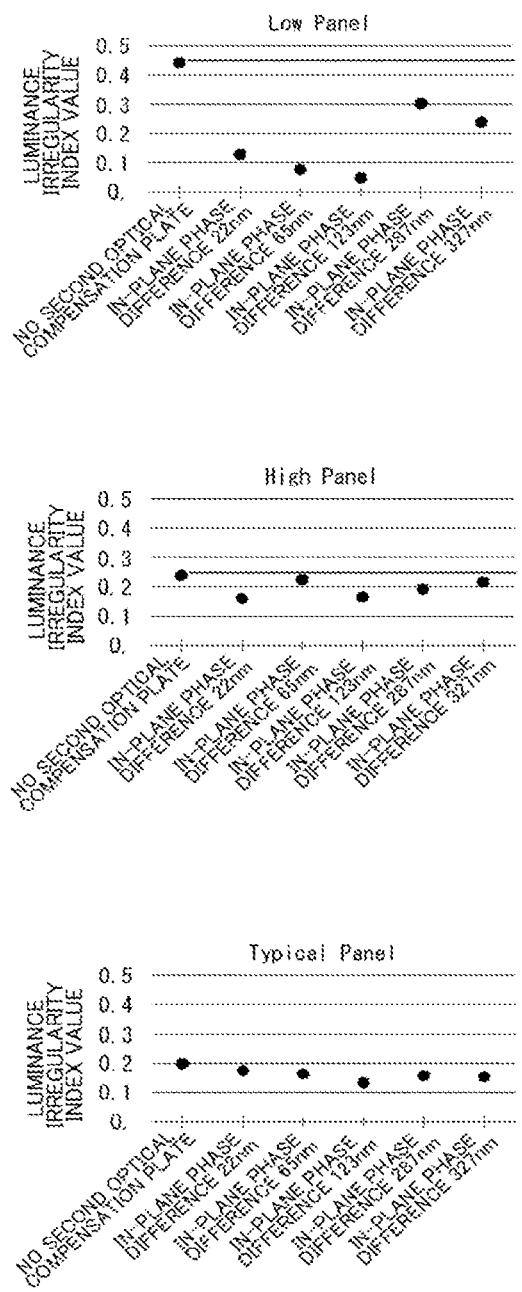
FIG. 29 is a diagram illustrating an evaluation result of a relation between an amount of in-plane phase difference of the second optical compensation unit and luminance irregularity.
Figure 30:
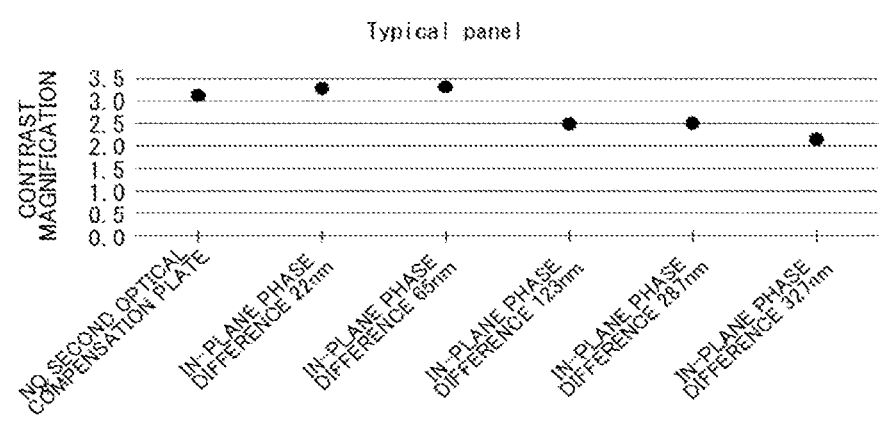
FIG. 30 is a diagram illustrating an evaluation result of a relation between an amount of in-plane phase difference of the second optical compensation unit and contrast.

Accordingly, the present applicants have evaluated relations between an amount of in-plane phase difference of the second optical compensation plate 30, and luminance irregularity and contrast, as illustrated in FIGS. 29 and 30.

FIG. 29 illustrates a result obtained by evaluating the relation between the amount of in-plane phase difference of the second optical compensation plate 30 and a luminance irregularity index value for each of the Low, Typical, and High panels. Here, a maximum value among central luminance ratios of the above-described four corners is used as the luminance irregularity index value (specifically, an absolute value obtained by subtracting 1 from the maximum value is used, and a luminance difference from the center is greater as the numeral value is larger).

In FIG. 29, results obtained by shielding R and B and carrying out the evaluation for single color G are shown. The luminance irregularity in black display is a combination of RGB in three plates. Since luminance irregularity of each color is combined and final irregularity occurs, the suppression in the luminance irregularity in the single color leads to elimination of the irregularity in black display.

As illustrated, an amount of in-plane phase difference on the horizontal axis is no second optical compensation plate 30 (an amount of phase difference=0), 22 nm, 65 nm, 123 nm, 287 nm, and 327 nm.

In FIG. 29, since the optical compensation plate 21 in the first optical compensation unit 20a is designed to match the amount of phase difference of the Typical panel, the luminance irregularity index value in the case in which there is no second optical compensation plate 30 is the smallest in the Typical panel. By optimizing the direction of the optical axis in combination of the second optical compensation plate 30, it is possible to decrease the luminance irregularity index value (that is, the illuminance irregularity is suppressed). Here, in the evaluation of FIG. 29 (and FIG. 30), the optical compensation unit 20C in which the optical compensation plate 21 is formed so as to be integrated with the second optical compensation plate 30 is used as in FIG. 24. When the direction of the optical axis is optimized and the rotation adjustment mechanism 33 is used, the optical compensation plate 21 and the second optical compensation plate 30 are rotated in conjunction. When the second optical compensation plate 30 is rotated in a plane, a bright location and a dark location on a screen are moved. Therefore, a location at which a difference in luminance is small and a balance is achieved is fixed and the evaluation is carried out.

From the result of FIG. 29, to suppress the luminance irregularity, it can be understood that an amount of in-plane phase difference of the second optical compensation plate 30 is preferably greater than at least 0 nm and equal to or less than 330 nm.

When only the Low panel is focused on, the luminance irregularity is suppressed satisfactorily within a range of the amount of in-plane phase difference from 22 nm to 123 nm. From this result, it is preferable to generally set the amount of in-plane phase difference of the second optical compensation plate 30 within the range from 20 nm to 120 nm.

FIG. 30 illustrates an evaluation result of the relation between the amount of in-plane phase difference of the second optical compensation plate 30 and contrast (here, a contrast magnification) and specifically illustrates an evaluation result in the Typical panel.

Even in this case, an amount of phase difference on the horizontal axis is no second optical compensation plate 30 (an amount of phase difference=0), 22 nm, 65 nm, 123 nm, 287 nm, and 327 nm.

When the case in which there is no second optical compensation plate 30 is used as a reference, an improvement in the contrast is admitted up to the amount of in-plane phase difference=65 nm. On the contrary, the contrast deteriorates in the amount of in-plane phase difference=123 nm or more.

From this result, when the improvement in the contrast is achieved in addition to a reduction in the luminance irregularity because of the second optical compensation plate 30, it can be said that it is preferable to generally set the amount of in-plane phase difference within a range greater than from 0 nm and equal to or less than 100 nm.

<4. Modification Examples>

Here, the configuration (see FIG. 22) in which the optical compensation plate 21 is separate from the second optical compensation plate 30 and the configuration (see FIG. 24) in which the optical compensation plate 21 is integrated with the second optical compensation plate 30 have been exemplified above as the configuration of the optical compensation unit according to the present technology, but a configuration of the optical compensation unit is not limited thereto.

Figure 31:
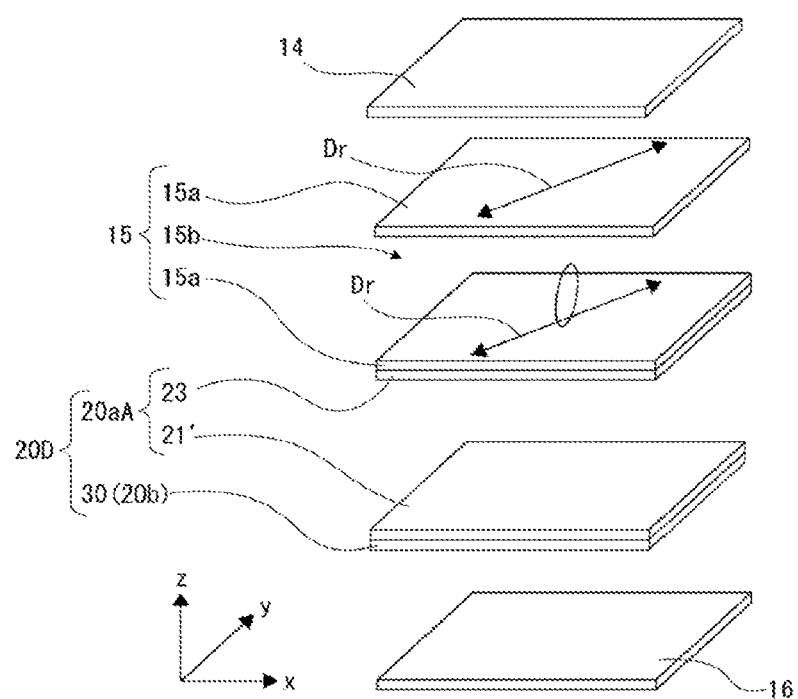
FIG. 31 is a diagram illustrating another example in which the optical compensation plates included in the first optical compensation unit and the optical compensation plates included in the second optical compensation unit are formed so as to be integrated.
Figure 32:
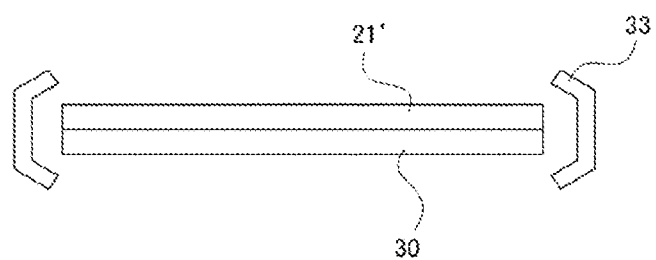
FIG. 32 is a diagram schematically illustrating a configuration of a rotation adjustment mechanism corresponding to the configuration of FIG. 31.

For example, a configuration of an optical compensation unit 20D illustrated in FIG. 31 can be adopted. In the optical compensation unit 20D, as exemplified as the first optical compensation unit 20aA in FIG. 18 above, an optical compensation plate 21' is separate from the negative C plate 23, and the negative C plate 23 is formed so as to be integrated with the substrate 15a of the liquid crystal panel 15. In addition, as illustrated, the second optical compensation plate 30 is formed so as to be integrated with the optical compensation plate 21'. In this case, when an in-plane rotation angle of the second optical compensation plate 30 is adjusted, as illustrated in the schematic diagram of FIG. 32, a compensation plate in which the optical compensation plate 21' is formed so as to be integrated with the second optical compensation plate 30 is configured to be maintained rotatably as the rotation adjustment mechanism 33.

Although not described in the drawing, an optical compensation plate included in the second optical compensation unit 20b can also be formed so as to be integrated with the liquid crystal panel 15 or a polarization plate (14 or 16). For example, the second optical compensation unit 20b can have a configuration in which the rotation adjustment mechanism 33 is not provided. For example, in this case, the second optical compensation plate 30 can also be formed so as to be integrated with the liquid crystal panel 15, the incidence-side polarization plate 14, or the emission-side polarization plate 16.

The second optical compensation unit 20b is not limited to the configuration in which one optical compensation plate is provided. For example, as described above, when the O plates are combined to have refractive index anisotropy in an in-plane direction, the second optical compensation unit 20b can have a configuration including a plurality of optical compensation plates in which O plates (phase difference layers) are formed on different substrates. In this way, when the second optical compensation plate 30 includes the plurality of optical compensation plates, some or all of the optical compensation plates can be formed so as to be integrated with any of the liquid crystal panel 15, the incidence-side polarization plate 14, or the emission-side polarization plate 16.

The example in which the present technology is applied to the liquid crystal display device 1 including the transmissive liquid crystal panel 15 has been described above. However, the present technology can be appropriately applied to a liquid crystal display device 1A including a reflective liquid crystal panel 15'.

Figure 33:
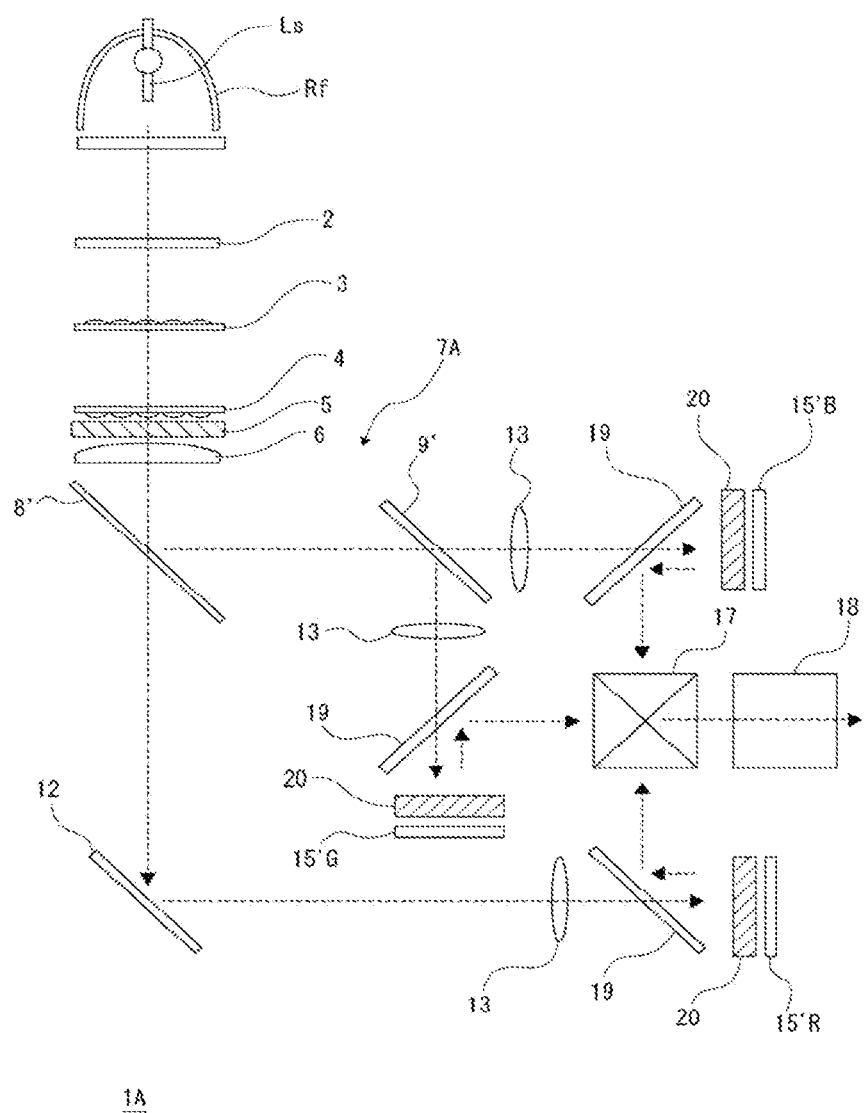
FIG. 33 is a diagram illustrating a configuration example of a reflective liquid crystal display device to which the optical compensation device according to the embodiment is applied.

FIG. 33 is a diagram illustrating a configuration example of the liquid crystal display device 1A.

In the liquid crystal display device 1A, the optical compensation unit 20 is applied when a reflective liquid crystal configuration for reflecting light passing through the liquid crystal layer 15b from a mirror and causing the light to pass through the liquid crystal layer 15b again is adopted.

A difference from the liquid crystal display device 1 illustrated in FIG. 1 is that a separation and combination optical system 7A is provided instead of the separation and combination optical system 7. In the separation and combination optical system 7A, dichroic mirrors 8' and 9' are provided instead of the dichroic mirrors 8 and 9. In the separation and combination optical system 7A, three liquid crystal panels 15'R, 15'G, and 15'B corresponding to R, G, and B light are provided as reflective liquid crystal panels 15'. Further, in the separation and combination optical system 7A, a reflective polarization plate 19 (wire grid) is provided as a polarization plate provided in each of the liquid crystal panels 15'R, 15'G, and 15'B.

The dichroic mirror 8' transmits the R light of incident light from the capacitor lens 6 and reflects G and B light of the incident light. When the G and B light reflected by the dichroic mirror 8' is incident, the dichroic mirror 9' transmits the B light and reflects the G light. Thus, the light emitted from the capacitor lens 6 is separated into the R, G, and B light.

The R light transmitting through the dichroic mirror 8' is reflected from the mirror 12, passes through the capacitor lens 13 for the R light, and then is incident on the reflective polarization plate 19 for the R light. The G light reflected from the dichroic mirror 9' is incident on the reflective polarization plate 19 for the G light via the capacitor lens 13 for the G light, and the B light passing through the dichroic mirror 9' is incident on the reflective polarization plate 19 for the B light via the capacitor lens 13 for the B light.

In this example, the light emitted from the capacitor lens 6 becomes p-polarized light by an operational effect of the polarization conversion element 5. The reflective polarization plates 19 for the R, G, and B light are configured to transmit p-polarized light and reflect s-polarized light. Accordingly, for the R, B, and G light, the light incident on the reflective polarization plates 19 from the capacitor lenses 13 passes through the reflective polarization plate 19.

For the R, B, and G light, the light passing through the reflective polarization plate 19 in this way is incident on the liquid crystal panels 15'R, 15'G, and 15'B via the optical compensation units 20 for the R, B, and G light. Each liquid crystal panel 15' is considered as a vertical alignment type liquid crystal panel.

In each liquid crystal panel 15', a mirror that reflects the light passing through the liquid crystal layer 15b (not illustrated) is formed on the opposite side to a light incidence surface. The light that passes through the reflective polarization plate 19 and is incident on the liquid crystal panel 15' passes through the liquid crystal layer 15b, is reflected again from the mirror, passes through the liquid crystal layer 15b again, and then is incident on the reflective polarization plate 19 via the optical compensation unit 20.

For the R, B, and G light, part of the light incident on the reflective polarization plate 19 from the side of the liquid crystal panel 15', that is, a component of the s-polarized light is reflected from the reflective polarization plate 19 and is incident on the color combination prism 17, as illustrated. The color combination prism 17 emits the incident R, G, and B light toward the respective projection lenses 18.

In the reflective liquid crystal display device 1A, as in the first optical compensation unit 20aA exemplified in FIG. 18 or the first optical compensation unit 20aB exemplified in FIG. 19, one or all of the optical compensation plates included in the first optical compensation unit can also be formed so as to be integrated with the liquid crystal panel 15' or the reflective polarization plate 19. Similarly, one or all of the optical compensation plates included in the second optical compensation unit can also be formed so as to be integrated with the liquid crystal panel 15' or the reflective polarization plate 19.

The example in which the wire-grid-based polarization plate is used as the reflective polarization plate 19 has been described above, but a polarization beam splitter (PBS) can also be used.

Here, the configurations of the optical systems of the liquid crystal display devices 1 and 1A described above are merely exemplary. For example, various optical elements (not illustrated) can also be disposed (for example, an ML is disposed on the incident surface side of the liquid crystal panel 15 and 15').

<5. Conclusion of Embodiment>

The optical compensation device (the optical compensation unit 20, 20A, 20B, 20C, or 20D) described above includes a first optical compensation unit (the first optical compensation units 20a, 20aA, or 20aB) configured to generate a phase difference that has a substantially equal amount and a reverse sign in light with each incidence angle within a predetermined incidence angle range on the vertical alignment type liquid crystal panel (the liquid crystal panel 15 or 15') with respect to a phase difference occurring from the liquid crystal panel; and the second optical compensation unit (the second optical compensation unit 20b) configured to generate a phase difference in an in-plane direction.

The foregoing first optical compensation unit can appropriately compensate for a phase difference occurring in tilted light passing through the liquid crystal panel. Further, the second optical compensation unit can suppress luminance irregularity in black display.

An improvement in image quality can be achieved by compensating for a phase difference occurring in tilted light to achieve an improvement in contrast and thus suppressing luminance irregularity in black display.

In the optical compensation device according to the embodiment, optical compensation plates (the optical compensation plate 21, 21', and the negative C plate 23) included in the first optical compensation unit is disposed parallel to the liquid crystal panel.

Thus, the compensation of the phase of the tilted light is realized the optical compensation plate disposed parallel to the liquid crystal panel.

Accordingly, it is not necessary to dispose the optical compensation plates obliquely when the phase of the tilted light is compensated for, and thus it is possible to achieve miniaturization of the optical system.

Further, the optical compensation device according to the embodiment includes a rotation adjustment mechanism (the rotation adjustment mechanism 33) configured to adjust a rotational angle in an in-plane direction of the optical compensation plate included in the second optical compensation unit.

Thus, it is easy to optimize the compensation effect of luminance irregularity. Accordingly, the compensation effect of the luminance irregularity is easily improved and the improvement in the image quality can be achieved. Further, it is possible to achieve an improvement in contrast by adjusting the rotational angle of the optical compensation plate included in the second optical compensation unit.

Further, in the optical compensation device according to the embodiment, an optical compensation plate included in the first optical compensation unit is formed so as to be integrated with an optical compensation plate included in the second optical compensation unit (see FIG. 24 or 31).

Thus, it is possible to achieve a reduction in the number of components by integral molding and miniaturization of the optical system.

Furthermore, in the optical compensation device according to the embodiment, an optical compensation plate included in the first optical compensation unit and an optical compensation plate included in the second optical compensation unit are formed so as to be separated as separate optical compensation plates (see FIG. 22 or the like).

Thus, for example, the degree of disposition of the compensation plates can be improved, for example, by separately disposing the optical compensation plate included in the first optical compensation unit and the optical compensation plate included in the second optical compensation unit before and after the liquid crystal panel along an optical path from the light source, and by separately disposing some of the optical compensation plates among the optical compensation plates and the other optical compensation units before and after the liquid crystal panel along the optical path and separately disposing the optical compensation plates included in the second optical compensation unit before and after the liquid crystal panel when the number of optical compensation plates included in the first optical compensation unit is plural. Accordingly, it is possible to achieve an improvement in the degree of design of the optical system.

In the optical compensation device according to the embodiment, one or all of an optical compensation plate included in the first optical compensation unit and an optical compensation plate included in the second optical compensation unit are formed so as to be integrated with the liquid crystal panel or a polarization plate (see FIGS. 18, 19, and 31).

Thus, it is possible to achieve a reduction in the number of components by integral molding and miniaturization of the optical system.

A liquid crystal display device according to an embodiment (the liquid crystal display device 1 or 1A) includes: a vertical alignment type liquid crystal panel (the liquid crystal panel 15 or 15'); a first optical compensation unit (the first optical compensation unit 20*a*, 20*a*A, or 20*a*B) configured to generate a phase difference that has a substantially equal amount and a reverse sign in light with each incidence angle within a predetermined incidence angle range on the liquid crystal panel with respect to a phase difference occurring from the liquid crystal panel; and a second optical compensation unit (the second optical compensation unit 20*b*) configured to generate a phase difference in an in-plane direction.

In the liquid crystal display device according to the embodiment, it is possible to obtain similar operational effects as those of the optical compensation device according to the foregoing embodiment.

In the liquid crystal display device (the liquid crystal display device 1) according to the embodiment, the liquid crystal panel (the liquid crystal panel 15) is a transmissive liquid crystal panel.

Thus, it is possible to achieve suppression in luminance irregularity in black display while appropriately offsetting a phase difference occurring in tilted light in correspondence to a case in which the transmissive liquid crystal panel is adopted.

Accordingly, in the liquid crystal display device in which the transmissive liquid crystal panel is adopted, an improvement in image quality can be achieved by compensating for a phase difference occurring in tilted light to achieve an improvement in contrast and thus suppressing luminance irregularity in black display.

Further, in the liquid crystal display device (the liquid crystal display device 1A) according to the embodiment, the liquid crystal panel (the liquid crystal panel 15') is a reflective liquid crystal panel.

Thus, it is possible to achieve suppression in luminance irregularity in black display while appropriately offsetting a phase difference occurring in tilted light in correspondence to a case in which the reflective liquid crystal panel is adopted. Accordingly, in the liquid crystal display device in which the reflective liquid crystal panel is adopted, an improvement in image quality can be achieved by compensating for a phase difference occurring in tilted light to achieve an improvement in contrast and thus suppressing luminance irregularity in black display.

In the liquid crystal display device according to the embodiment, an optical compensation plate included in the first optical compensation unit is disposed parallel to the liquid crystal panel.

Thus, the compensation of the phase of the tilted light is realized by the optical compensation plate (the optical compensation plate 21 or 21', or the negative C plate 23) disposed parallel to the liquid crystal panel.

Accordingly, it is not necessary to dispose the optical compensation plates obliquely when the phase of the tilted light is compensated for, and thus it is possible to achieve miniaturization of the optical system.

Further, the liquid crystal display device according to the embodiment includes a rotation adjustment mechanism (the rotation adjustment mechanism 33) configured to adjust a rotational angle in an in-plane direction of the optical compensation plate (the optical compensation plate 30) included in the second optical compensation unit.

Thus, it is easy to optimize the compensation effect of the luminance irregularity. Accordingly, the compensation effect of the luminance irregularity is easily improved and the improvement in the image quality can be achieved. Further, it is possible to achieve an improvement in contrast by adjusting the rotational angle of the optical compensation plate included in the second optical compensation unit.

Further, in the liquid crystal display device according to the embodiment, an optical compensation plate included in the first optical compensation unit is formed so as to be integrated with an optical compensation plate included in the second optical compensation unit.

Thus, it is possible to achieve a reduction in the number of components by integral molding and miniaturization of the optical system.

Furthermore, in the liquid crystal display device according to the embodiment, an optical compensation plate included in the first optical compensation unit and an optical compensation plate included in the second optical compensation unit are formed so as to be separated as separate optical compensation plates.

Thus, for example, the degree of disposition of the compensation plates can be improved, for example, by separately disposing the optical compensation plate included in the first optical compensation unit and the optical compensation plate included in the second optical compensation unit before and after the liquid crystal panel along an optical path from the light source, and by separately disposing some of the optical compensation plates among the optical compensation plates and the other optical compensation units before and after the liquid crystal panel along the optical path and separately disposing the optical compensation plates included in the second optical compensation unit before and after the liquid crystal panel when the number of optical compensation plates included in the first optical compensation unit is plural. Accordingly, it is possible to achieve an improvement in the degree of design of the optical system.

In the liquid crystal display device according to the embodiment, one or all of an optical compensation plate included in the first optical compensation unit and an optical compensation plate included in the second optical compensation unit are formed so as to be integrated with the liquid crystal panel or a polarization plate.

Thus, it is possible to achieve a reduction in the number of components by integral molding and miniaturization of the optical system.

The advantageous effects described in the present specification are merely exemplary and are not limited, and other advantageous effects may be obtained.

<6. Present Technology>

The present technology can be configured as follows.

(1)

An optical compensation device including:

a first optical compensation unit configured to generate a phase difference that has a substantially equal amount and a reverse sign in light with each incidence angle within a predetermined incidence angle range on a vertical alignment type liquid crystal panel with respect to a phase difference occurring from the liquid crystal panel; and a second optical compensation unit configured to generate a phase difference in an in-plane direction.

(2)

The optical compensation device according to (1), wherein an optical compensation plate included in the first optical compensation unit is disposed parallel to the liquid crystal panel.

(3)

The optical compensation device according to (1) or (2), further including: a rotation adjustment mechanism configured to adjust a rotational angle in an in-plane direction of the optical compensation plate included in the second optical compensation unit.

(4)

The optical compensation device according to any one of (1) to (3), wherein an optical compensation plate included in the first optical compensation unit is formed so as to be integrated with an optical compensation plate included in the second optical compensation unit.

(5)

The optical compensation device according to any one of (1) to (4), wherein an optical compensation plate included in the first optical compensation unit and an optical compensation plate included in the second optical compensation unit are formed so as to be separated as separate optical compensation plates.

(6)

The optical compensation device according to any one of (1) to (5), wherein one or all of an optical compensation plate included in the first optical compensation unit and an optical compensation plate included in the second optical compensation unit are formed so as to be integrated with the liquid crystal panel or a polarization plate.

(7)

A liquid crystal display device including:

a vertical alignment type liquid crystal panel;

a first optical compensation unit configured to generate a phase difference that has a substantially equal amount and a reverse sign in light with each incidence angle within a predetermined incidence angle range on the liquid crystal panel with respect to a phase difference occurring from the liquid crystal panel; and a second optical compensation unit configured to generate a phase difference in an in-plane direction.

(8)

The liquid crystal display device according to (7), wherein the liquid crystal panel is a transmissive liquid crystal panel.

(9)

The liquid crystal display device according to (7), wherein the liquid crystal panel is a reflective liquid crystal panel.

(10)

The liquid crystal display device according to any one of (7) to (9), wherein an optical compensation plate included in the first optical compensation unit is disposed parallel to the liquid crystal panel.

(11)

The liquid crystal display device according to any one of (7) to (10), further including:

a rotation adjustment mechanism configured to adjust a rotational angle in an in-plane direction of an optical compensation plate included in the second optical compensation unit.

(12)

The liquid crystal display device according to any one of (7) to (11), wherein an optical compensation plate included in the first optical compensation unit is formed so as to be integrated with an optical compensation plate included in the second optical compensation unit.

(13)

The liquid crystal display device according to any one of (7) to (12), wherein an optical compensation plate included in the first optical compensation unit and an optical compensation plate included in the second optical compensation unit are formed so as to be separated as separate optical compensation plates.

(14)

The liquid crystal display device according to any one of (7) to (13), wherein one or all of an optical compensation plate included in the first optical compensation unit and an optical compensation plate included in the second optical compensation unit are so as to be integrated with the liquid crystal panel or a polarization plate.

REFERENCE SIGNS LIST 1, 1A Liquid crystal display device
Ls Light source
5 Polarization conversion element
7 Separation or combination optical system
8 Dichroic mirror
9 Dichroic mirror
10 Filter
13 Capacitor lens
14 Incidence-side polarization plate
15 (15R, 15G, 15B), 15' (15'R, 15'G, 15'B) Liquid crystal panel
15a Substrate
15b Liquid crystal layer
16 Emission-side polarization plate
17 Color combination prism
18 Projection lens (projection optical system)
19 Reflective polarization plate
20, 20A, 20B, 20C, 20D Optical compensation unit
20a, 20aA, 20aB First optical compensation unit
20b Second optical compensation unit
21, 21' Optical compensation plate
22 Substrate
23 Negative C plate
24a, 24b O plate
25 Substrate
30 Second optical compensation plate
31 Phase difference layer
32 Substrate
33 Rotation adjustment mechanism

The invention claimed is:

1. An optical compensation device comprising:
    a first optical compensation unit configured to generate a phase difference that has a reverse sign with each incidence angle within a predetermined incidence angle range on a vertical alignment type liquid crystal panel with respect to a phase difference occurring from the liquid crystal panel; and
    a second optical compensation unit configured to generate a phase difference in an in-plane direction after rotation adjustment.

2. The optical compensation device according to claim 1, wherein an optical compensation plate included in the first optical compensation unit is disposed parallel to the liquid crystal panel.

3. The optical compensation device according to claim 1, further comprising:
    a rotation adjustment mechanism configured to adjust a rotational angle in an in-plane direction of an optical compensation plate included in the second optical compensation unit.

4. The optical compensation device according to claim 1, wherein an optical compensation plate included in the first optical compensation unit is formed so as to be integrated with an optical compensation plate included in the second optical compensation unit.

5. The optical compensation device according to claim 1, wherein an optical compensation plate included in the first optical compensation unit and an optical compensation plate included in the second optical compensation unit are formed so as to be separated as separate optical compensation plates.

6. The optical compensation device according to claim 1, wherein one or all of an optical compensation plate included in the first optical compensation unit and an optical compensation plate included in the second optical compensation unit are formed so as to be integrated with the liquid crystal panel or a polarization plate.

7. A liquid crystal display device comprising:
    a vertical alignment type liquid crystal panel;
    a first optical compensation unit configured to generate a phase difference that has a reverse sign with each incidence angle within a predetermined incidence angle range on the liquid crystal panel with respect to a phase difference occurring from the liquid crystal panel; and
    a second optical compensation unit configured to generate a phase difference in an in-plane direction after rotation adjustment.

8. The liquid crystal display device according to claim 7, wherein the liquid crystal panel is a transmissive liquid crystal panel.

9. The liquid crystal display device according to claim 7, wherein the liquid crystal panel is a reflective liquid crystal panel.

10. The liquid crystal display device according to claim 7, wherein an optical compensation plate included in the first optical compensation unit is disposed parallel to the liquid crystal panel.

11. The liquid crystal display device according to claim 7, further comprising:
    a rotation adjustment mechanism configured to adjust a rotational angle in an in-plane direction of an optical compensation plate included in the second optical compensation unit.

12. The liquid crystal display device according to claim 7, wherein an optical compensation plate included in the first optical compensation unit is formed so as to be integrated with an optical compensation plate included in the second optical compensation unit.

13. The liquid crystal display device according to claim 7, wherein an optical compensation plate included in the first optical compensation unit and an optical compensation plate included in the second optical compensation unit are formed so as to be separated as separate optical compensation plates.

14. The liquid crystal display device according to claim 7, wherein one or all of an optical compensation plate included in the first optical compensation unit and an optical compensation plate included in the second optical compensation unit are formed so as to be integrated with the liquid crystal panel or a polarization plate.

15. An optical compensation device comprising:
    a first optical compensation unit configured to generate a phase difference that has a substantially equal amount and a reverse sign in light with each incidence angle within a predetermined incidence angle range on a vertical alignment type liquid crystal panel with respect to a phase difference occurring from the liquid crystal panel;
    a second optical compensation unit configured to generate a phase difference in an in-plane direction; and a rotation adjustment mechanism configured to adjust a rotational angle in an in-plane direction of an optical compensation plate included in the second optical compensation unit.

* * * * *